US012127206B2

(12) United States Patent
Yamamoto et al.

(10) Patent No.: US 12,127,206 B2
(45) Date of Patent: *Oct. 22, 2024

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,967

(22) Filed: Sep. 20, 2022

(65) Prior Publication Data

US 2023/0018154 A1    Jan. 19, 2023

Related U.S. Application Data

(63) Continuation of application No. 16/631,637, filed as application No. PCT/JP2018/022309 on Jun. 12, 2018, now Pat. No. 11,490,373.

(30) Foreign Application Priority Data

Aug. 8, 2017    (JP) ................................. 2017-153353

(51) Int. Cl.
*H04W 72/04*    (2023.01)
*H04L 5/00*    (2006.01)
(Continued)

(52) U.S. Cl.
CPC ........... *H04W 72/21* (2023.01); *H04L 5/0055* (2013.01); *H04L 27/2607* (2013.01); *H04W 72/541* (2023.01)

(58) Field of Classification Search
CPC ...... H04J 11/005; H04J 13/0074; H04J 13/22; H04L 27/2607; H04L 5/0055; H04W 72/21; H04W 72/541
See application file for complete search history.

(56) References Cited

U.S. PATENT DOCUMENTS

2013/0058302 A1   3/2013   Kim et al.
2014/0334431 A1   11/2014   Zhou et al.
(Continued)

FOREIGN PATENT DOCUMENTS

CN    110651516 A    1/2020
CN    110999143 A    4/2020
(Continued)

OTHER PUBLICATIONS

The Indian Office Action dated Nov. 18, 2022 for related Indian Patent Application No. 202248018367. (6 pages).
(Continued)

*Primary Examiner* — Mansour Oveissi
(74) *Attorney, Agent, or Firm* — Seed IP Law Group LLP

(57) ABSTRACT

In a terminal, a control unit decides a sequence used for an uplink control channel, in accordance with uplink control information, and a transmission unit transmits the uplink control information using the sequence. Here, the sequence is calculated using cell identification information that identifies the cell to which the terminal belongs, and subcell-specific information relating to at least one subcell included in the cell.

14 Claims, 18 Drawing Sheets

(51) Int. Cl.
  *H04L 27/26* (2006.01)
  *H04W 72/21* (2023.01)
  *H04W 72/541* (2023.01)

(56) References Cited

U.S. PATENT DOCUMENTS

| | | | |
|---|---|---|---|
| 2015/0085788 A1 | 3/2015 | Kim et al. | |
| 2015/0244507 A1 | 8/2015 | Sorrentino | |
| 2016/0241374 A1 | 8/2016 | Seo et al. | |
| 2016/0374090 A1 | 12/2016 | Kim et al. | |
| 2017/0302414 A1* | 10/2017 | Islam | H04B 7/0421 |
| 2018/0184418 A1 | 6/2018 | Takeda et al. | |
| 2019/0007175 A1* | 1/2019 | Kwak | H04L 5/0053 |
| 2020/0137748 A1 | 4/2020 | Lindqvist et al. | |
| 2020/0170005 A1 | 5/2020 | Matsumura et al. | |
| 2020/0205182 A1 | 6/2020 | Yamamoto et al. | |

FOREIGN PATENT DOCUMENTS

| | | | |
|---|---|---|---|
| EP | 3 641 432 A1 | 4/2020 | |
| EP | 3 644 531 A1 | 4/2020 | |
| JP | 2016-536944 A | 11/2016 | |
| WO | WO 2008/133486 A1 * | 11/2008 | H04B 7/26 |
| WO | 2011/139064 A2 | 11/2011 | |
| WO | 2014/104773 A1 | 7/2014 | |
| WO | 2017/113332 A1 | 7/2017 | |

OTHER PUBLICATIONS

3GPP TS 36.211 V13.4.0, "3rd Generation Partnership Project; Technical Specification Group Radio Access Network; Evolved Universal Terrestrial Radio Access (E-UTRA); Physical channels and modulation (Release 13)", Dec. 2016.
3GPP TS 36.212 V13.4.0, "3rd Generation Partnership Project; Technical Specification Group Radio Access Network; Evolved Universal Terrestrial Radio Access (E-UTRA); Multiplexing and channel coding (Release 13)", Dec. 2016.
3GPP TS 36.213 V13.4.0, "3rd Generation Partnership Project; Technical Specification Group Radio Access Network; Evolved Universal Terrestrial Radio Access (E-UTRA); Physical layer procedures (Release 13)", Dec. 2016.
English Translation of Chinese Search Report dated Nov. 10, 2020 for the related Chinese Patent Application No. 2018800488793, 2 pages.
English Translation of Taiwan Search Report dated Feb. 10, 2022 for related Taiwan Patent Application No. 107120473. (2 pages).
The Extended European Search Report dated Oct. 6, 2020 for the related European Patent Application No. 18844429.3, 17 pages.
Indian Examination Report dated Mar. 1, 2022 for related Indian Patent Application No. 202047003853, 4 pages.
Intel Corporation, "2-symbol NR PUCCH," 3GPP TSG RAN WG1 NR Ad-Hoc#2 R1-1710552, Jun. 30, 2017, 4 pages.
International Search Report of PCT application No. PCT/JP2018/022309 dated Sep. 18, 2018.
NTT Docomo, Inc., "DMRS-based vs. Sequence-based PUCCH in short duration," 3GPP TSG RAN WG1 Meeting #88 R1-1702811, Feb. 17, 2017, 9 pages.
Partial Supplementary European Search Report dated Jul. 23, 2020 for the related European Patent Application No. 18844429.3, 16 pages.
R1-1612228, "Proposal of subcell", 3GPP TSG RAN WG1 Meeting #87, Nov. 2016.
R1-1708508, "On the design of short PUCCH for NR", 3GPP TSG RAN WG1 #89, May 2017.
R1-1711649, "Discussion on 1-symbol NR-PUCCH for UCI of up to 2 bits", 3GPP TSG RAN WG1 NR Ad-Hoc #2, Jun. 2017.
R1-1713344, "Discussion on 1-symbol NR-PUCCH for UCI of up to 2 bits", 3GPP TSG RAN WG1 Meeting #90, Aug. 2017.
English Translation of Chinese Search Report dated Oct. 19, 2023 for the related Chinese Patent Application No. 202110829290.0, 3 pages.
Qualcomm Incorporated, "Clarification on a few PUCCH formats 4/5 related issues in eCA,", R1-1610094, 3GPP TSG RAN WG1 #86bis, Lisbon, Portugal, Oct. 10-14, 2016. (3 pages).

* cited by examiner

200

TERMINAL AND COMMUNICATION METHOD

TECHNICAL FIELD

The present disclosure relates to a terminal and a communication method.

BACKGROUND ART

With the spread of services using mobile broadband in recent years, data traffic in mobile communication has continued to increase exponentially, and looking forward there is a pressing need to expand data transmission capacities. Furthermore, in the future, dramatic developments are anticipated for the IoT (Internet of Things) in which all "things" are connected via the Internet. To support the diversification of services by means of the IoT, dramatic advancements are needed not only for data transmission capacities but also for various requirements such as low delay properties and communication areas (coverage). With this background, progress is being made in the technical development/standardization of the fifth-generation mobile communication system (5G), which considerably improves performance and function compared to the fourth-generation mobile communication system (4G).

In the 3GPP (Third Generation Partnership Project), in the standardization of 5G, progress is being made in the technical development of new radio access technology (NR: new radio) which does not always have backward compatibility with LTE (Long Term Evolution)-Advanced (for example, see NPL 1 to 3).

In NR, consideration is being given to a terminal (UE: user equipment) transmitting a response signal (ACK/NACK: acknowledgment/negative acknowledgment or HARQ-ACK) indicating an error detection result for downlink data, channel state information (CSI) for a downlink, and uplink control information (UCI) such as a radio resource allocation request (SR: scheduling request) for an uplink, to a base station (eNB or gNB), using an uplink control channel (PUCCH: physical uplink control channel).

Furthermore, in NR, consideration is being given to transmitting a one to two-bit UCI included in a PUCCH.

Furthermore, NR supports a "short PUCCH" in which a PUCCH is transmitted using one symbol or two symbols within one slot, and a "long PUCCH" in which a PUCCH is transmitted using three symbols or more (for example, there may be four symbols as the minimum number of symbols).

CITATION LIST

Non Patent Literature

NPL 1: 3GPP TS 36.211 V13.4.0, "Evolved Universal Terrestrial Radio Access (E-UTRA); Physical Channels and Modulation (Release 13)", December 2016.

NPL 2: 3GPP TS 36.212 V13.4.0, "Evolved Universal Terrestrial Radio Access (E-UTRA); Multiplexing and channel coding (Release 13)", December 2016.

NPL 3: 3GPP TS 36.213 V13.4.0, "Evolved Universal Terrestrial Radio Access (E-UTRA); Physical layer procedures (Release 13)", December 2016.

NPL 4: R1-1612228, "Proposal of subcell," Panasonic, RAN1 #87, November 2016.

SUMMARY OF INVENTION

However, consideration has not been sufficiently given to a method for controlling interference in a PUCCH that includes a one to two-bit UCI.

An embodiment of the present disclosure facilitates providing a terminal and a communication method with which it is possible to appropriately control interference in a PUCCH that includes a one to two-bit UCI.

A terminal according to an embodiment of the present disclosure is provided with: a circuit that decides a sequence used for an uplink control channel, in accordance with uplink control information; and a transmitter that transmits the uplink control information using the sequence, in which the sequence is decided using cell identification information that identifies a cell to which the terminal belongs, and subcell-specific information relating to at least one subcell included in the cell.

A terminal according to an embodiment of the present disclosure is provided with: a circuit that decides a sequence used for an uplink control channel, in accordance with uplink control information; and a transmitter that transmits the uplink control information using the sequence, in which the maximum number of sequences that can be allocated within one resource block of the uplink control channel is limited.

A terminal according to an embodiment of the present disclosure is provided with: a circuit that decides a sequence used for an uplink control channel, in accordance with uplink control information; and a transmitter that transmits the uplink control information using the sequence, in which the uplink control information includes at least an ACK and a NACK, and cyclic shifts used for the sequence are separated into a first region that includes a cyclic shift allocated to the ACK and a second region that includes a cyclic shift allocated to the NACK.

A communication method according to an embodiment of the present disclosure includes: deciding a sequence used for an uplink control channel, in accordance with uplink control information; and transmitting the uplink control information using the sequence, in which the sequence is decided using cell identification information that identifies a cell to which the terminal belongs, and subcell-specific information relating to at least one subcell included in the cell.

A communication method according to an embodiment of the present disclosure includes: deciding a sequence used for an uplink control channel, in accordance with uplink control information; and transmitting the uplink control information using the sequence, in which the maximum number of sequences that can be allocated within one resource block of the uplink control channel is limited.

A communication method according to an embodiment of the present disclosure includes: deciding a sequence used for an uplink control channel, in accordance with uplink control information; and transmitting the uplink control information using the sequence, in which the uplink control information includes at least an ACK and a NACK, and cyclic shifts used for the sequence are separated into a first region that includes a cyclic shift allocated to the ACK and a second region that includes a cyclic shift allocated to the NACK.

It should be noted that general or specific embodiments hereof may be realized by a system, a method, an integrated circuit, a computer program, or a recording medium, and may be realized by an arbitrary combination of a system, a device, a method, an integrated circuit, a computer program, and a recording medium.

According to an embodiment of the present disclosure, it is possible to appropriately control interference in a PUCCH that includes a one to two-bit UCI.

Additional benefits and advantages in an embodiment of the present disclosure will be made apparent from the specification and drawings. The benefits and/or advantages

DESCRIPTION OF EMBODIMENTS

Hereinafter, embodiments of the present disclosure will be described in detail with reference to the drawings.

Figure 1:
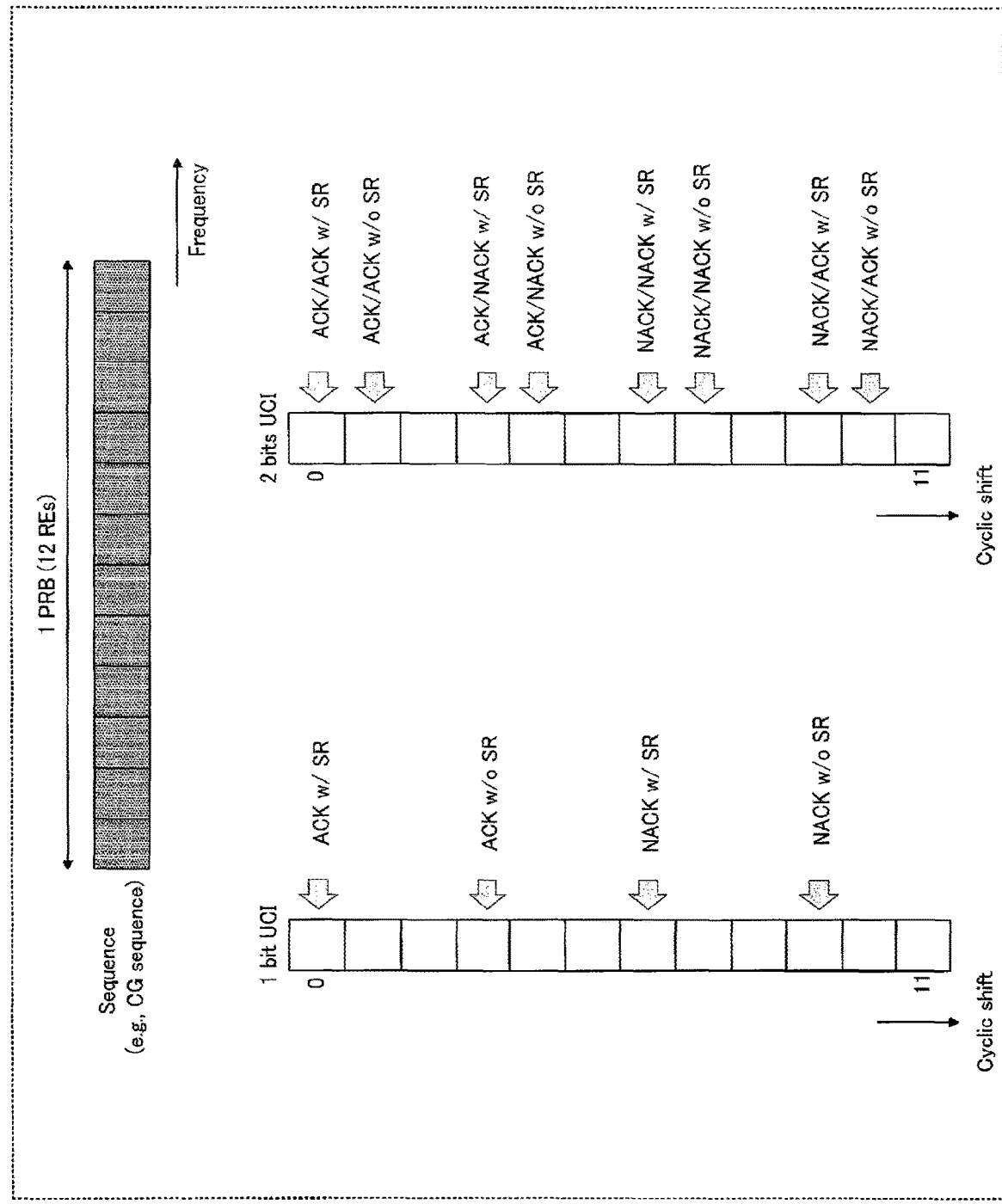
FIG. 1 depicts an example of a sequence selection scheme.

As depicted in FIG. 1, for short PUCCHs, consideration is being given to a method for selecting a sequence used to transmit a short PUCCH (hereinafter referred to as a sequence selection scheme), on the basis of a one or two-bit UCI and whether or not there is an SR. In FIG. 1, the combination of an ACK/NACK and whether or not there is an SR is associated with a cyclic shift (cyclic shift amount). For sequence selection, it is possible to use a cyclic shift of a CAZAC (constant amplitude zero autocorrelation) code sequence or a CG (computer generated) sequence, as depicted in FIG. 1, for example.

When short PUCCHs composed of CAZAC code sequences or CG sequences are used, even in a case where the sequences used for PUCCHs (sometimes also referred to as PUCCH sequences) transmitted from different terminals are different from each other, the PUCCH transmissions from those terminals are not completely orthogonal, and therefore interference is produced by the cross-correlation characteristics among the sequences. The interference produced when, for example, different sequences are allocated among cells is "inter-cell interference".

Furthermore, in a case where the sequences used for PUCCHs transmitted from different terminals are the same, when the cyclic shifts used for the PUCCHs transmitted from those terminals are different from each other, the PUCCH transmissions of those terminals are completely orthogonal as long as the time and frequency in the PUCCH transmissions are synchronized among those terminals. However, in a case where there is an effect from a transmission timing deviation among terminals, a frequency selective fading channel, or the like, interference occurs even when the sequences used for PUCCHs transmitted from the terminals are the same and the cyclic shifts are different.

For short PUCCHs, it would be better to consider the effect of the interference mentioned above.

Here, 30 CG sequences are defined in LTE. Furthermore, PUCCHs for each cell are differentiated by identification information (hereinafter referred to as a "cell ID") that identifies cells. When cell IDs are different, the CG sequences used for PUCCHs are different.

Furthermore, in LTE, the allocating of CG sequences for PUCCHs or the deciding of cyclic shift patterns for PUCCHs is applied based on a hopping pattern in order to randomize the effect of interference. When the cell ID is different, the initial value of a random sequence that decides the hopping pattern is different. Furthermore, in LTE, by using virtual cell IDs for generating PUCCH signal sequences and setting the same cell ID among different cells, it is possible to control interference when cells are synchronized with CoMP (coordinated multiple point transmission and reception) or the like (for example, see NPL 1).

Incidentally, in NR, the case where a plurality of TRPs (transmission and reception points) are included within the same cell is assumed. In this case, for PUCCHs transmitted from terminals communicating with different TRPs within the same cell, it is necessary to differentiate therebetween by using different PUCCH resources (cyclic shifts and time or frequency resources).

However, in the allocation of PUCCH sequences based on cell IDs mentioned above, there is an increase in the PUCCH resources required for the PUCCH transmissions of terminals communicating with different TRPs, and there is a decline in the frequency utilization efficiency for uplinks within the cell.

Furthermore, by allocating different cell IDs to terminals communicating with different TRPs using virtual cell IDs such as that mentioned above, it is also possible for PUCCH resources within a cell to be dispersed in different CG sequences. However, virtual cell IDs are indicated using higher layer signals specific to the terminals after initial access has been completed. Therefore, in a PUCCH transmission in the initial access stage (for example, an ACK/NACK response for message 4), it is necessary to allocate a PUCCH sequence that is based on the cell ID rather than a virtual cell ID.

In an embodiment of the present disclosure, a description will be given regarding a method with which the effect of interference can be reduced in a radio communication system in which short PUCCHs are transmitted.

Embodiments will be described in detail hereinafter.

Embodiment 1

[Overview of Communication System]

The communication system according to each embodiment of the present disclosure is provided with a base station 100 and a terminal 200.

Figure 2:
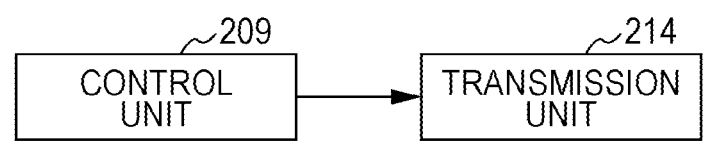
FIG. 2 depicts the configuration of part of a terminal according to embodiment 1.

FIG. 2 is a block diagram depicting the configuration of part of the terminal 200 according to each embodiment of the present disclosure. In the terminal 200 depicted in FIG. 2, a control unit 209 decides a sequence (PUCCH sequence) used for an uplink control channel (PUCCH), in accordance with uplink control information (UCI), and a transmission unit 214 transmits the uplink control information using the sequence. Here, the sequence is calculated using cell identification information (cell ID) that identifies the cell to which the terminal 200 belongs, and subcell-specific information relating to at least one subcell included in the cell.

[Configuration of Base Station]

Figure 3:
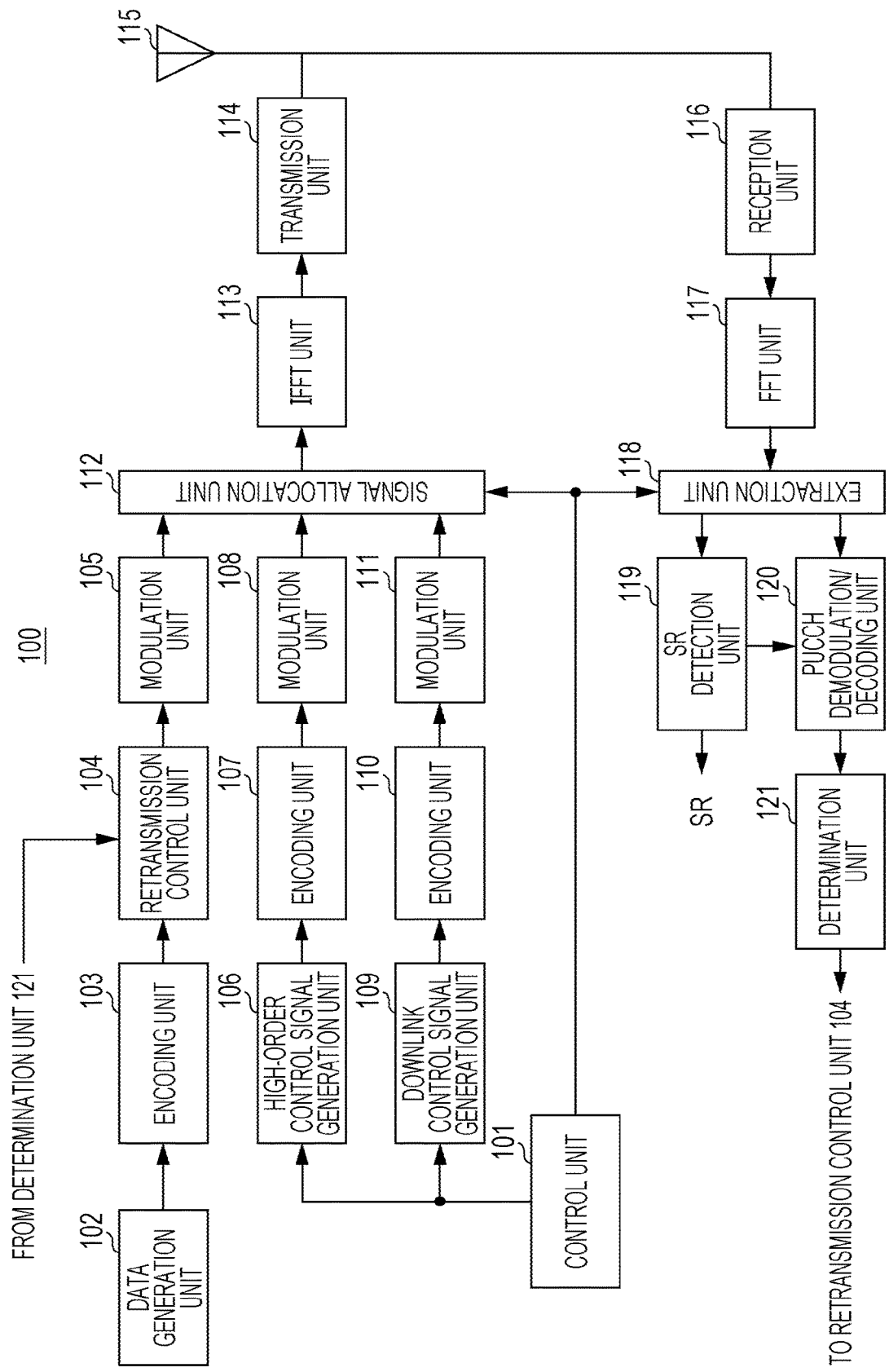
FIG. 3 depicts the configuration of a base station according to embodiment 1.

FIG. 3 is a block diagram depicting the configuration of the base station 100 according to embodiment 1 of the present disclosure. In FIG. 3, the base station 100 has a control unit 101, a data generation unit 102, an encoding unit 103, a retransmission control unit 104, a modulation unit 105, a higher layer control signal generation unit 106, an encoding unit 107, a modulation unit 108, a downlink control signal generation unit 109, an encoding unit 110, a modulation unit 111, a signal allocation unit 112, an IFFT (inverse fast Fourier transform) unit 113, a transmission unit 114, an antenna 115, a reception unit 116, an FFT (fast Fourier transform) unit 117, an extraction unit 118, an SR detection unit 119, a PUCCH demodulation/decoding unit 120, and a determination unit 121.

The control unit 101 decides the allocation of a radio resource for a downlink signal (for example, a PDSCH: physical downlink shared channel), and outputs downlink resource allocation information that instructs the allocation of a resource for the downlink signal, to the downlink control signal generation unit 109 and the signal allocation unit 112.

Furthermore, the control unit 101 decides the allocation of a PUCCH resource (time, frequency, sequence, or the like) corresponding to a HARQ-ACK signal for the downlink signal and whether or not there is an SR, and outputs information relating to the PUCCH resource allocation (PUCCH resource allocation information) to the higher layer control signal generation unit 106 (or the downlink control signal generation unit 109) and the extraction unit 118.

At such time, the control unit 101 decides PUCCH sequence numbers or cyclic shift patterns as PUCCH resources. It should be noted that details of a method for deciding PUCCH resources will be described later.

The data generation unit 102 generates downlink data for the terminal 200, and outputs the downlink data to the encoding unit 103.

The encoding unit 103 carries out error correction encoding on the downlink data that is input from the data generation unit 102, and outputs an encoded data signal to the retransmission control unit 104.

The retransmission control unit 104, at the time of the first transmission, retains the encoded data signal that is input from the encoding unit 103, and also outputs the encoded data signal to the modulation unit 105. Furthermore, the retransmission control unit 104 outputs corresponding retained data to the modulation unit 105 when a NACK for a transmitted data signal is input from the determination unit 121 described later. On the other hand, the retransmission control unit 104 deletes corresponding retained data when an ACK for a transmitted data signal is input from the determination unit 121.

The modulation unit 105 modulates a data signal that is input from the retransmission control unit 104, and outputs a modulated data signal to the signal allocation unit 112.

The higher layer control signal generation unit 106 generates a control information bit string using control information that is input from the control unit 101 (for example, PUCCH resource allocation information or the like), and outputs the generated control information bit string to the encoding unit 107.

The encoding unit 107 carries out error correction encoding on the control information bit string that is input from the higher layer control signal generation unit 106, and outputs an encoded control signal to the modulation unit 108.

The modulation unit 108 modulates the control signal that is input from the encoding unit 107, and outputs a modulated control signal to the signal allocation unit 112.

The downlink control signal generation unit 109 generates a downlink control information bit string (for example, DCI: downlink control information) using control information that is input from the control unit 101 (for example, downlink resource allocation information, PUCCH resource allocation information, or the like), and outputs the generated control information bit string to the encoding unit 110. It should be noted that, since control information is sometimes transmitted to a plurality of terminals, the downlink control signal generation unit 109 may generate bit strings with the terminal ID of each terminal being included in the control information for each terminal.

The encoding unit 110 carries out error correction encoding on the control information bit string that is input from the downlink control signal generation unit 109, and outputs an encoded control signal to the modulation unit 111.

The modulation unit 111 modulates the control signal that is input from the encoding unit 110, and outputs a modulated control signal to the signal allocation unit 112.

The signal allocation unit 112 maps the data signal that is input from the modulation unit 105 to a radio resource indicated in the downlink resource allocation information that is input from the control unit 101. Furthermore, the signal allocation unit 112 maps the control signal that is input from the modulation unit 108 or the modulation unit 111 to a radio resource. The signal allocation unit 112 outputs a downlink signal for which signal mapping has been carried out, to IFFT unit 113.

The IFFT unit 113 carries out transmission waveform generation processing such as OFDM on the signal that is input from the signal allocation unit 112. The IFFT unit 113 adds a CP (cyclic prefix) in the case of an OFDM transmission in which a CP is to be added (not depicted). The IFFT unit 113 outputs the generated transmission waveform to the transmission unit 114.

The transmission unit 114 carries out RF (radio frequency) processing such as D/A (digital-to-analog) conversion or up-conversion on the signal that is input from the IFFT unit 113, and transmits a radio signal to the terminal 200 via the antenna 115.

The reception unit 116 carries out RF processing such as down-conversion or A/D (analog-to-digital) conversion on an uplink signal waveform from the terminal 200 received via the antenna 115, and outputs the uplink signal waveform having been subjected to reception processing to the FFT unit 117.

The FFT unit 117 carries out FFT processing in which a time domain signal is converted into a frequency domain signal, on the uplink signal waveform that is input from the reception unit 116. The FFT unit 117 outputs the frequency domain signal obtained by the FFT processing to the extraction unit 118.

The extraction unit 118 extracts a radio resource portion of a PUCCH for an SR or a HARQ-ACK, from the signal that is input from the FFT unit 117, on the basis of information received from the control unit 101 (PUCCH resource allocation information or the like), and outputs the extracted radio resource component to the SR detection unit 119 and the PUCCH demodulation/decoding unit 120.

The SR detection unit 119 carries out power detection on a signal that is input from the extraction unit 118, and detects whether or not an SR is present. Furthermore, when having detected that there is an SR and a HARQ-ACK is being transmitted by means of an SR resource, the SR detection unit 119 outputs the signal that is input from the extraction unit 118 to the PUCCH demodulation/decoding unit 120.

The PUCCH demodulation/decoding unit 120 carries out equalization, demodulation, decoding, or power detection on a PUCCH signal that is input from the extraction unit 118 or the SR detection unit 119, and outputs a bit sequence obtained after decoding or a signal obtained after power detection to the determination unit 121.

The determination unit 121 determines whether a HARQ-ACK signal transmitted from the terminal 200 indicates an ACK or NACK for a transmitted data signal, on the basis of the bit sequence or the signal obtained after power detection that is input from the PUCCH demodulation/decoding unit 120. The determination unit 121 outputs a determination result to the retransmission control unit 104.

[Configuration of Terminal]

Figure 4:
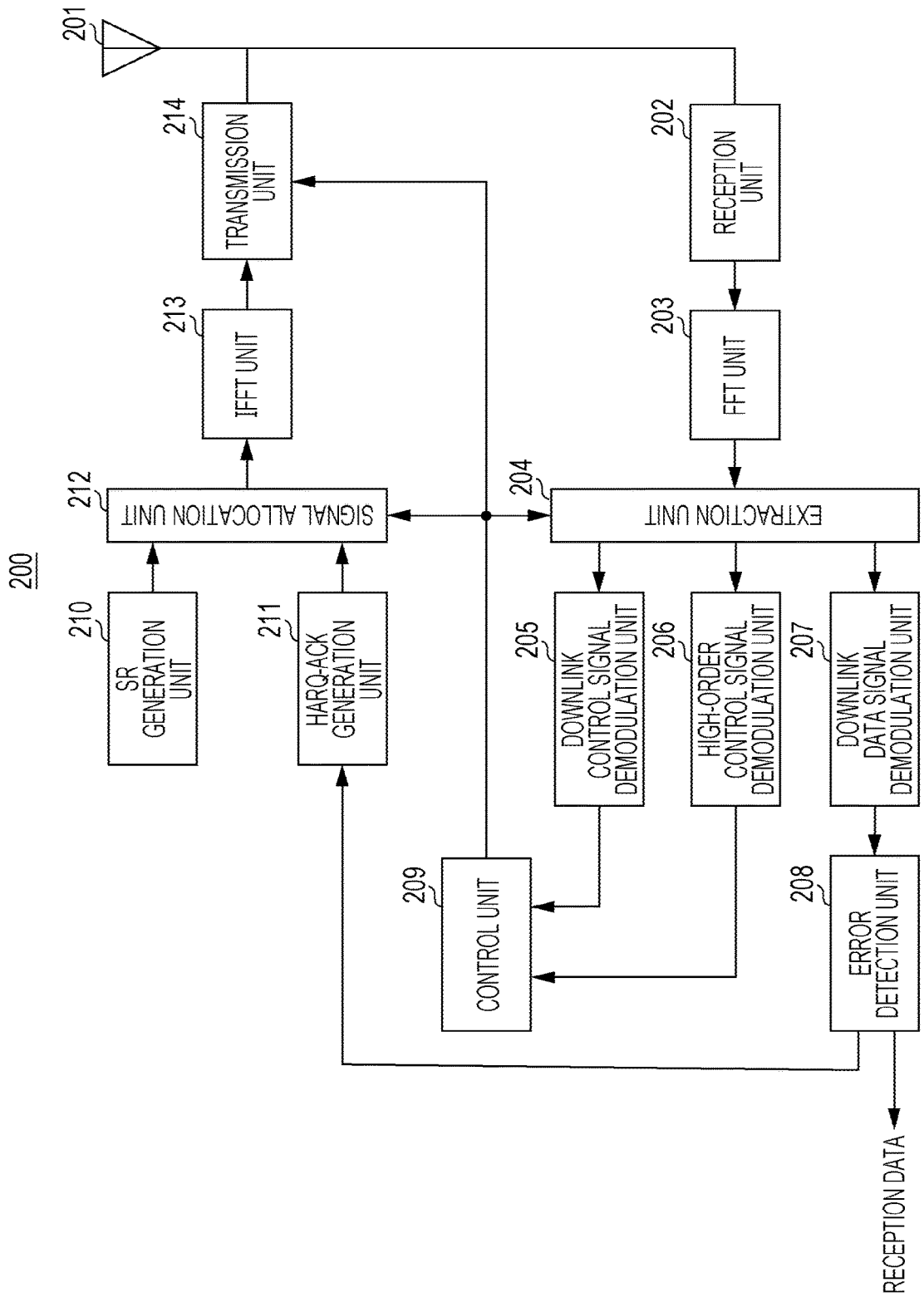
FIG. 4 depicts the configuration of the terminal according to embodiment 1.

FIG. 4 is a block diagram depicting the configuration of the terminal 200 according to embodiment 1 of the present disclosure. In FIG. 4, the terminal 200 has an antenna 201, a reception unit 202, an FFT unit 203, an extraction unit 204, a downlink control signal demodulation unit 205, a higher layer control signal demodulation unit 206, a downlink data signal demodulation unit 207, an error detection unit 208, the control unit 209, an SR generation unit 210, a HARQ-ACK generation unit 211, a signal allocation unit 212, an IFFT unit 213, and the transmission unit 214.

The reception unit 202 carries out RF processing such as down-conversion or A/D (analog-to-digital) conversion with respect to the signal waveform of a downlink signal (data signal or control signal) from the base station 100 received via the antenna 201, and outputs an obtained reception signal (baseband signal) to the FFT unit 203.

The FFT unit 203 carries out FFT processing in which a time domain signal is converted into a frequency domain signal, on the signal (time domain signal) that is input from the reception unit 202. The FFT unit 203 outputs a frequency domain signal obtained by the FFT processing to the extraction unit 204.

The extraction unit 204 extracts a downlink control signal from the signal that is input from the FFT unit 203, on the basis of control information that is input from the control unit 209, and outputs the downlink control signal to the downlink control signal demodulation unit 205. Furthermore, the extraction unit 204 extracts a higher layer control signal and a downlink data signal on the basis of the control information that is input from the control unit 209, outputs the higher layer control signal to the higher layer control signal demodulation unit 206, and outputs the downlink data signal to the downlink data signal demodulation unit 207.

The downlink control signal demodulation unit 205 carries out blind decoding on the downlink control signal that is input from the extraction unit 204, and, when having determined that the downlink control signal is a control signal addressed thereto, demodulates and outputs the control signal to the control unit 209.

The higher layer control signal demodulation unit 206 demodulates the higher layer control signal that is input from the extraction unit 204, and outputs the demodulated higher layer control signal to the control unit 209.

The downlink data signal demodulation unit 207 demodulates/decodes the downlink data signal that is input from the extraction unit 204, and outputs the decoded downlink data signal to the error detection unit 208.

The error detection unit 208 carries out error detection on the downlink data that is input from the downlink data signal demodulation unit 207, and outputs the error detection result to the HARQ-ACK generation unit 211. Furthermore, the error detection unit 208 outputs, as reception data, downlink data determined as having no errors as a result of the error detection.

The control unit 209 calculates a radio resource allocation for a downlink data signal on the basis of downlink resource allocation information indicated in the control signal that is input from the downlink control signal demodulation unit 205, and outputs information indicating the calculated radio resource allocation to the extraction unit 204.

Furthermore, the control unit 209 calculates PUCCH resources with which an SR and a HARQ-ACK are transmitted, on the basis of PUCCH resource allocation information relating to the allocation of resources for PUCCHs for the SR and the HARQ-ACK, indicated in the higher layer control signal that is input from the higher layer control signal demodulation unit 206 or the control signal that is input from the downlink control signal demodulation unit 205. The control unit 209 then outputs information relating to the calculated PUCCH resources to the signal allocation unit 212.

Furthermore, the control unit 209 decides time/frequency resources and sequences for the PUCCHs with which the terminal 200 actually transmits the SR and the HARQ-ACK, by means of a method described later, and outputs the decided information to the signal allocation unit 212 and the transmission unit 214.

The SR generation unit 210 generates an SR in a case where the terminal 200 requests the base station 100 for the allocation of a radio resource for uplink transmission, and outputs the generated SR signal to the signal allocation unit 212.

The HARQ-ACK generation unit 211 generates a HARQ-ACK signal (ACK or NACK) for the received downlink data, on the basis of an error detection result that is input from the error detection unit 208. The HARQ-ACK generation unit 211 outputs the generated HARQ-ACK signal (bit sequence) to the signal allocation unit 212.

The signal allocation unit 212 maps the SR signal that is input from the SR generation unit 210, or the HARQ-ACK signal that is input from the HARQ-ACK generation unit 211, to a radio resource instructed from the control unit 209. The signal allocation unit 212 outputs an uplink signal for which signal mapping has been carried out (for example, uplink control information (UCI)), to the IFFT unit 213.

The IFFT unit 213 carries out transmission waveform generation processing such as OFDM on the signal that is input from the signal allocation unit 212. The IFFT unit 213 adds a CP (cyclic prefix) in the case of an OFDM transmission in which a CP is to be added (not depicted). Alternatively, in a case where the IFFT unit 213 is to generate a single carrier waveform, a DFT (discrete Fourier transform)

unit may be added at a stage prior to the signal allocation unit 212 (not depicted). The IFFT unit 213 outputs the generated transmission waveform to the transmission unit 214.

The transmission unit 214 carries out RF (radio frequency) processing such as transmission power control, D/A (digital-to-analog) conversion, or up-conversion which is based on information that is input from the control unit 209, on the signal that is input from the IFFT unit 213, and transmits a radio signal to the base station 100 via the antenna 201.

[Operation of Base Station 100 and Terminal 200]

A detailed description will be given regarding an operation in the base station 100 and the terminal 200 having the above configurations.

Figure 5:
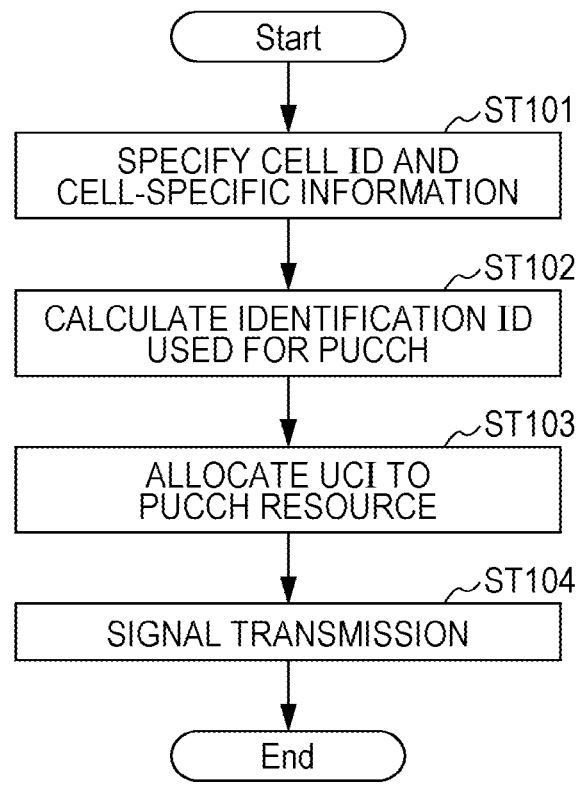
FIG. 5 depicts processing carried out by the terminal according to embodiment 1.

FIG. 5 depicts a flow of the processing carried out by the terminal 200 according to the present embodiment.

In the present embodiment, the sequence number (sequence ID) of a PUCCH sequence (for example, a CG sequence) is decided using additional identification information (an identification ID) in addition to a cell ID.

For example, information relating to a subcell (for example, a subcell ID that identifies a subcell), information relating to a beam in a radio communication system in which beamforming is applied (for example, a beam ID that identifies a beam), information relating to initial access (random access), or the like may be used as the additional identification information. Hereinafter, the additional identification information will be referred to as "subcell-specific information", which is information that is specific to a subcell.

Figure 6:
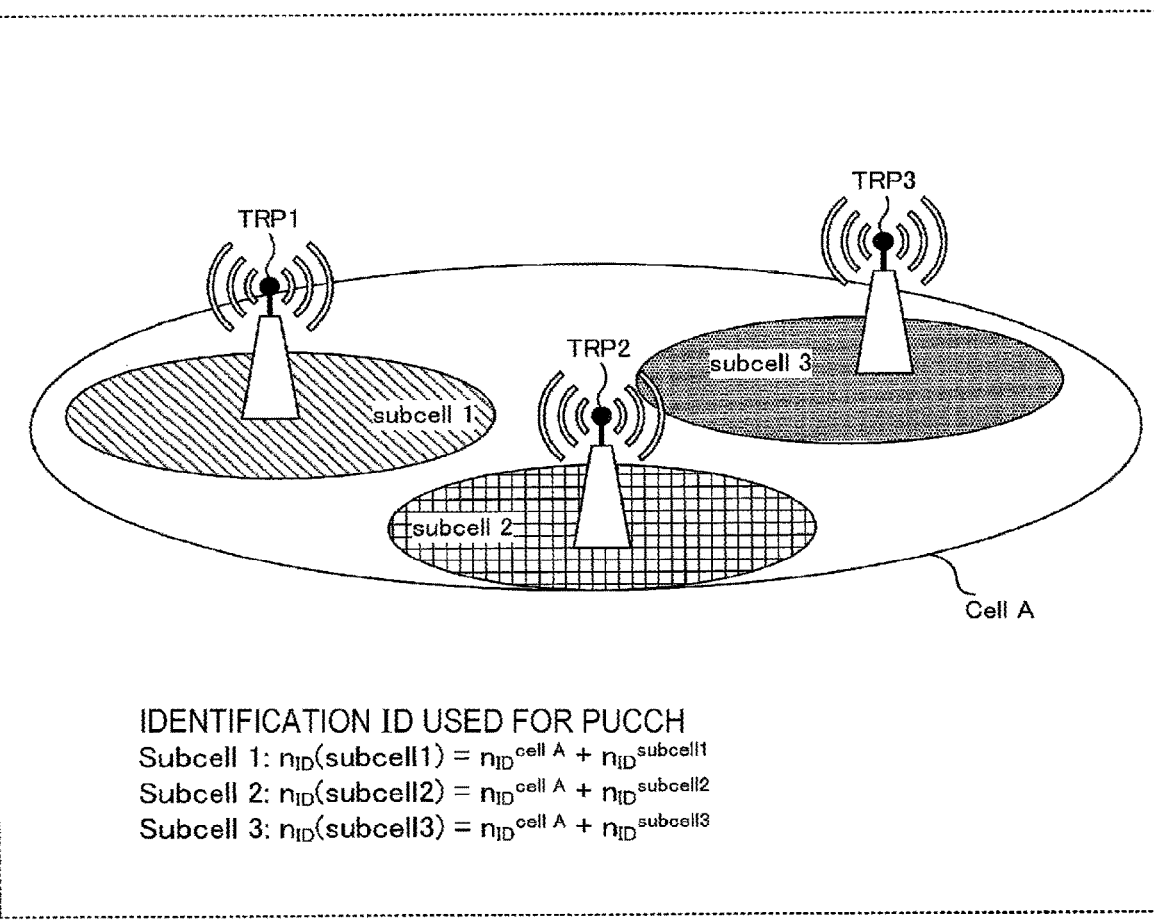
FIG. 6 depicts an example of a method for deciding a sequence ID using a subcell ID according to embodiment 1.

It should be noted that a "subcell" is a cell that is formed for each of one or more TRPs within one cell, for example, as depicted in FIG. 6 described later (for example, see NPL 4). Furthermore, a subcell can also be a cell that is formed for each of one or more beams formed in one cell (or TRP). Furthermore, in a case where sub-bands having a plurality of different numerologies are formed within the system band in one cell (or TRP), a subcell can also be a cell that is formed for each sub-band. Furthermore, a subcell can also be a cell that is set according to coverage within a cell.

Furthermore, the information relating to random access, for example, may be information relating to a random access resource indicated by a "PDCCH order" with which a network requests random access with respect to the terminal 200, or may be information relating to a random access resource (time, frequency, or code sequence) actually used by the terminal 200, in a case where a random access procedure has been started from the terminal 200.

The terminal 200 specifies the cell ID of the cell (base station 100) to which the terminal 200 belongs, and subcell-specific information (ST101). For example, the terminal 200 specifies at least one from among a subcell ID corresponding to a TRP that communicates with the terminal 200 (the subcell ID of the subcell to which the terminal 200 connects), a beam ID of a beam that is used for communication by the terminal 200, and information indicating a random access resource used for communication by the terminal 200.

Next, the terminal 200 calculates identification information (hereinafter referred to as an identification ID used for a PUCCH) for calculating a sequence number of a PUCCH sequence, using the cell ID and the subcell-specific information (ST102). The terminal 200 then decides a PUCCH resource (the sequence number of the PUCCH sequence) on the basis of the identification ID used for the calculated PUCCH.

The terminal 200 then allocates a UCI (a HARQ-ACK, an SR, or the like) to the decided PUCCH resource (ST103), and transmits the PUCCH to the base station 100 (ST104).

As mentioned above, in LTE, when cell IDs are different, the initial values of random sequences that decide the hopping patterns for PUCCH sequences are different. In the present embodiment also, similar to LTE, when the identification IDs used for PUCCHs decided based on cell IDs and subcell-specific information are different, the initial values of random sequences that decide the hopping pattern for PUCCH sequences are different, and the PUCCH sequences are different.

In other words, if subcell-specific information corresponding to different TRPs within the same cell (that is, in a case where the same cell ID is used) is mutually different, identification IDs (values decided based on the cell IDs and subcell-specific information) for deciding the sequence numbers of PUCCH sequences used in communication with these different TRPs are respectively different, and the sequence numbers of the PUCCH sequences can made to be different.

Consequently, even in an environment in which a plurality of TRPs are employed within the same cell, it is possible to allocate PUCCH sequences on the basis of different hopping patterns (different sequence numbers), among terminals 200 that communicate with the different TRPs. Therefore, in the PUCCHs transmitted from each terminal 200, it is possible to prevent the same PUCCH sequences colliding continuously, or a colliding plurality of sequences always being the same and causing bias in interference. That is, interference can be randomized in the transmission of short PUCCHs, and system performance can be improved by reducing the effect of interference.

Next, an example of a method for deciding a sequence number i of a PUCCH sequence allocated in a certain time unit n will be specifically described.

Here, the sequence number i of a PUCCH sequence is decided according to expression (1), for example.

$$i = f(n) \bmod N_{sequence} \quad (1)$$

In expression (1), f(n) is a hopping pattern. f(n) is generated using a pseudo-random sequence, as indicated in section 5.5.1.3 in NPL 1, for example. Furthermore, $N_{sequence}$ is number of sequences prepared for PUCCH use (30 in LTE, for example).

Furthermore, the method for generating a pseudo-random sequence used to generate f(n) is stipulated in section 7.2 of NPL 1, for example. The pseudo-random sequence is initialized in each certain time interval in accordance with the initial value $c_{int}$ of expression (2), for example. In expression (2), if the initial value $c_{int}$ is different, the pseudo-random sequence that is generated is different.

[Math. 1]

$$c_{int} = \lfloor n_{ID}/N_{sequence} \rfloor \quad (2)$$

In expression (2), $n_{ID}$ is an aforementioned identification ID used for a PUCCH. An identification ID ($n_{ID}$) used for a PUCCH may be notified to the terminal 200 by means of a higher layer signal specific to the terminal, or may be set by the terminal 200 using a cell ID ($n_{ID}^{cell}$) and subcell-specific information (at least one of $n_{ID}^{subcell}$, $n_{ID}^{beam}$, $n_{order}^{RA}$, and $n_{index}^{RA}$) as indicated below.

$$n_{ID} = n_{ID}^{cell} + n_{ID}^{subcell}$$

$$n_{ID} = n_{ID}^{cell} + n_{ID}^{beam}$$

$$n_{ID} = n_{ID}^{cell} + n_{order}^{RA}$$

$$n_{ID} = n_{ID}^{cell} + n_{index}^{RA}$$

$n_{ID}^{subcell}$ indicates a subcell ID, $n_{ID}^{beam}$ indicates a beam ID, $n_{order}^{RA}$ indicates information relating to a random access resource notified in a PDCCH order with which a network requests random access with respect to the terminal 200, and $n_{index}^{RA}$ indicates the number of the random access resource (time, frequency, or code sequence) actually used by the terminal 200. Furthermore, the identification ID used for a PUCCH may be set using a plurality of items of the aforementioned subcell-specific information.

Furthermore, examples of the time units n for hopping a PUCCH sequence include symbol units, slot units, subframe units, and the like. Furthermore, examples of time intervals in which a pseudo-random sequence is initialized include multiple symbol units, slot units, multiple slot units, subframe units, multiple subframe units, radio frame units, and the like.

Figure 7:
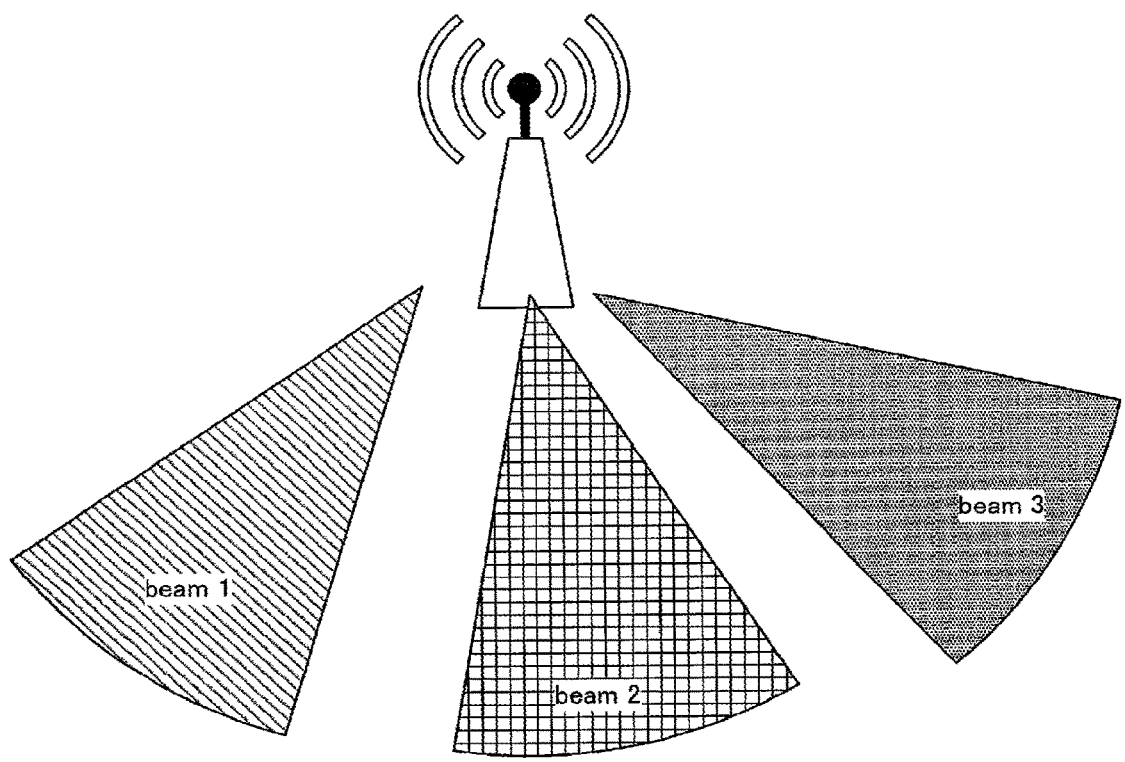
FIG. 7 depicts an example of a method for deciding a sequence ID using a beam ID according to embodiment 1.
Figure 8:
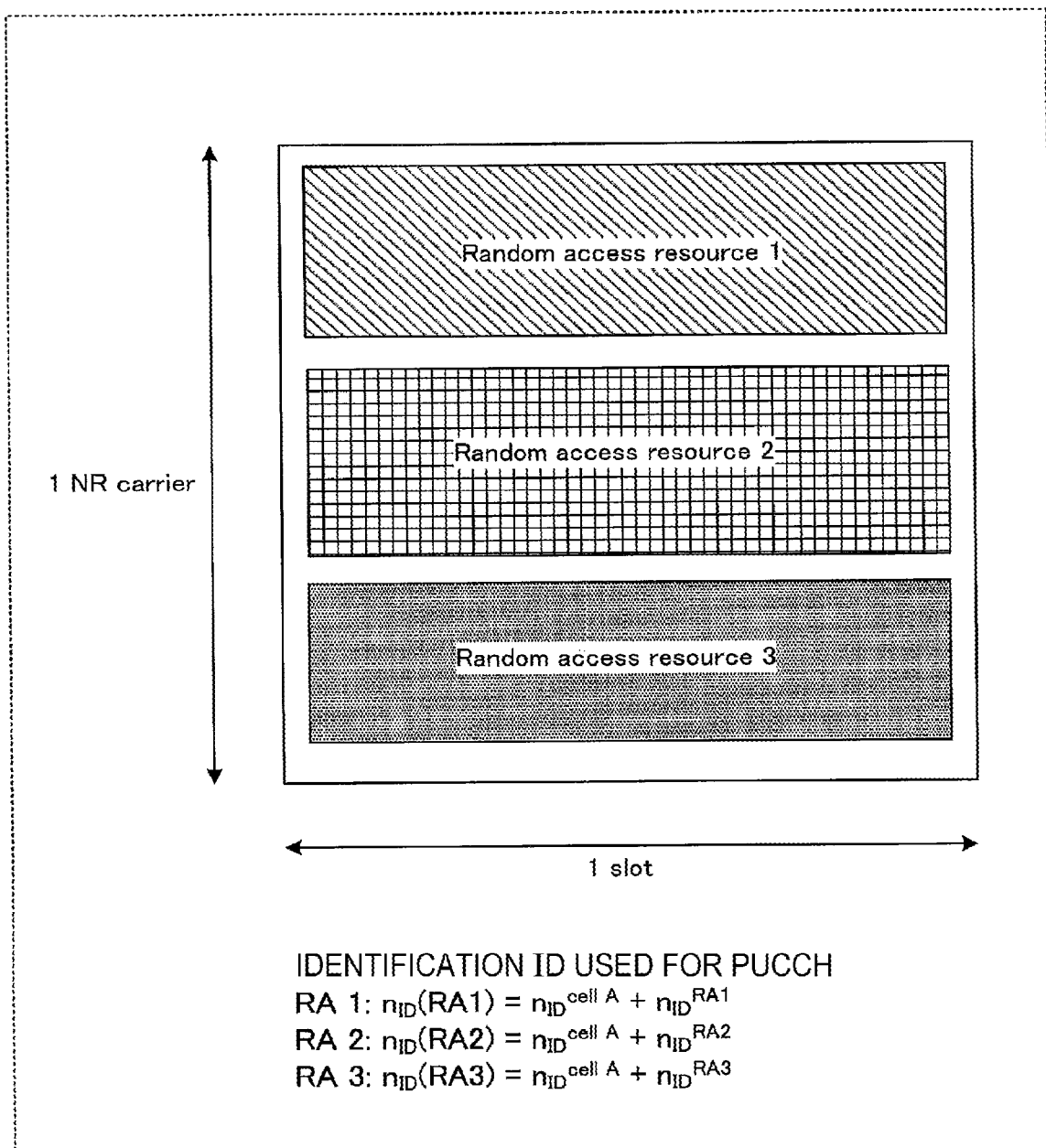
FIG. 8 depicts an example of a method for deciding a sequence ID using a random access resource according to embodiment 1.

FIGS. 6, 7, and 8 each depict, as an example, the way in which identification IDs used for PUCCHs are set according to subcells, beams, and random access resources (RA resources).

As depicted in FIGS. 6, 7, and 8, cell IDs used for setting identification IDs ($n_{ID}$) used for PUCCHs for the terminal 200 are all the cell ID of a cell A ($n_{ID}^{cell\ A}$).

For example, as depicted in FIG. 6, the terminal 200 sets the identification IDs ($n_{ID}$) used for PUCCHs, in accordance with the TRP with which the terminal 200 communicates, from among a TRP corresponding to subcell 1 (subcell ID: $n_{ID}^{subcell\ 1}$), a TRP corresponding to subcell 2 (subcell ID: $n_{ID}^{subcell\ 2}$), and a TRP corresponding to subcell 3 (subcell ID: $n_{ID}^{subcell\ 3}$). In FIG. 6, $n_{ID}$(subcell1), $n_{ID}$(subcell2), and $n_{ID}$(subcell3) are values that are different from each other.

Furthermore, for example, as depicted in FIG. 7, the terminal 200 sets the identification IDs ($n_{ID}$) used for PUCCHs, in accordance with the beam used in communication between the terminal 200 and a TRP, from among a beam 1 (beam ID: $n_{ID}^{beam\ 1}$) a beam 2 (beam ID: $n_{ID}^{beam\ 2}$), and a beam 3 (beam ID: $n_{ID}^{beam\ 3}$). In FIG. 7, $n_{ID}$(beam1), $n_{ID}$(beam2), and $n_{ID}$(beam3) are values that are different from each other.

Furthermore, for example, as depicted in FIG. 8, the terminal 200 sets the identification IDs ($n_{ID}$) used for PUCCHs, in accordance with the random access resource actually used with the TRP with which the terminal 200 communicates, from among an RA resource 1 ($n_{ID}^{RA1}$), an RA resource 2 ($n_{ID}^{RA2}$), and an RA resource 3 ($n_{ID}^{RA3}$). In FIG. 8, $n_{ID}$(RA1), $n_{ID}$(RA2), and $n_{ID}$(RA3) are values that are different from each other.

Furthermore, similar to the terminal 200, the base station 100 specifies a PUCCH resource (the sequence number of a PUCCH sequence) to which a PUCCH transmitted from the terminal 200 is allocated, using subcell-specific information corresponding to the TRP with which the terminal 200 communicates. The base station 100 then receives a PUCCH (UCI) transmitted by means of the decided PUCCH resource.

In this way, in the present embodiment, the terminal 200 decides a sequence (PUCCH sequence) that is used for a PUCCH, in accordance with a UCI (ACK, NACK, SR, or the like), and transmits the UCI using the PUCCH sequence. At such time, the PUCCH sequence is calculated using the cell ID of the cell to which the terminal 200 belongs and subcell-specific information. Specifically, the subcell-specific information is used to calculate the initial value of a pseudo-random sequence used for a hopping pattern for the sequence number of the PUCCH sequence.

For example, even within the same cell (same cell ID ($n_{ID}^{cell\ A}$)) as depicted in FIGS. 6, 7, and 8, the terminal 200 decides PUCCH sequences using subcell-specific information that is specific to the TRP (or subcell) with which the terminal 200 communicates, and it is thereby possible for different PUCCH resources to be allocated in a mutually distinguishable manner for PUCCHs transmitted from terminals 200 that are communicating with different TRPs within the same cell.

Thus, according to the present embodiment, even in an environment in which a plurality of TRPs are being employed within the same cell, interference can be randomized in short PUCCH transmissions, and the effect of interference can be reduced. In other words, according to the present embodiment, interference can be appropriately controlled in a PUCCH that includes a one to two-bit UCI.

Embodiment 2

The base station and the terminal according to the present embodiment have basic configurations that are common to those of the base station 100 and the terminal 200 according to embodiment 1, and will therefore be described with reference to FIGS. 3 and 4.

In embodiment 1, a description has been given regarding a method for setting the sequence number i of a PUCCH sequence as a PUCCH resource that is decided based on subcell-specific information. In contrast, in the present embodiment, a description will be given regarding a method for setting a cyclic shift pattern (that is, mapping between each UCI (ACKs/NACKs and SRs) and the sequence (cyclic shift)) of a PUCCH (PUCCH sequence) as a PUCCH resource.

In the present embodiment, similar to embodiment 1, the cyclic shift pattern of a PUCCH is decided using subcell-specific information in addition to a cell ID.

Similar to embodiment 1, for example, information relating to a subcell ID, a beam ID, or initial access (random access) or the like may be used as subcell-specific information. Furthermore, similar to embodiment 1, the information relating to random access, for example, may be information relating to a random access resource notified by a "PDCCH order" with which a network requests random access with respect to the terminal 200, or may be information relating to a random access resource (time, frequency, or code sequence) actually used by the terminal 200.

In other words, the terminal 200 specifies the cell ID of the cell (base station 100) to which the terminal 200 belongs and subcell-specific information (ST101 depicted in FIG. 5), calculates identification information (identification ID used for a PUCCH) for calculating a PUCCH sequence (cyclic shift pattern) (ST102 depicted in FIG. 5), and decides a PUCCH resource (cyclic shift pattern of the PUCCH) on the basis of the calculated identification ID used for the PUCCH. The terminal 200 then allocates a UCI (a HARQ-ACK and/or an SR) to the decided PUCCH resource (ST103 depicted in FIG. 5), and transmits the PUCCH to the base station 100 (ST104 depicted in FIG. 5).

As mentioned above, in LTE, when cell IDs are different, the initial values of random sequences that decide the hopping patterns used for cyclic shift patterns for PUCCHs are different. In the present embodiment also, similar to LTE, when the identification IDs used for PUCCHs decided based on cell IDs and subcell-specific information are different, the initial values of random sequences that decide the hopping patterns are different, and the cyclic shift patterns are different.

In other words, the terminal 200 shifts the cyclic shift patterns used for PUCCHs, in accordance with the subcell-specific information corresponding to the TRP with which communication is being carried out. Thus, if subcell-specific information corresponding to different TRPs within the same cell (that is, in a case where the same cell ID is used) is mutually different, identification IDs (values decided based on the cell IDs and subcell-specific information) for deciding the cyclic shift patterns of PUCCHs used in communication with these different TRPs are respectively different, and the cyclic shift patterns can made to be different.

Consequently, even in an environment in which a plurality of TRPs are employed within the same cell, it is possible to allocate PUCCH sequences on the basis of different hopping patterns (different cyclic shift patterns) among terminals 200 that communicate with the different TRPs. Therefore, in the PUCCHs transmitted from each terminal 200, it is possible to prevent the same cyclic shift patterns colliding continuously, or a colliding plurality of cyclic shift patterns always being the same and causing bias in interference. That is, interference can be randomized in the transmission of short PUCCHs, and system performance can be improved by reducing the effect of interference.

Next, an example of a method for deciding a cyclic shift pattern of a PUCCH sequence allocated in a certain time unit n will be specifically described.

Figure 9:
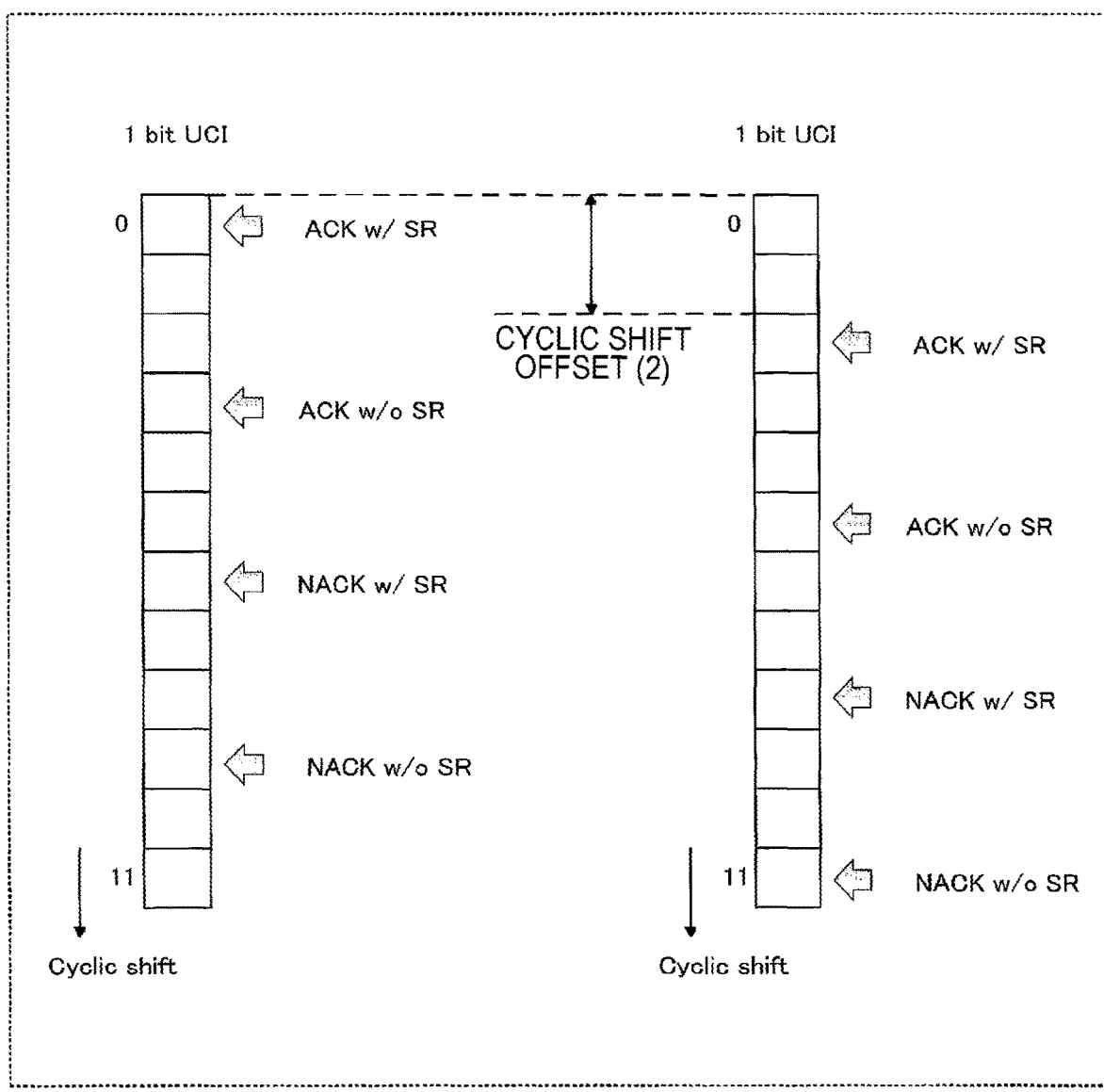
FIG. 9 depicts an example of deciding a cyclic shift pattern for a one-bit UCI according to embodiment 2.
Figure 10:
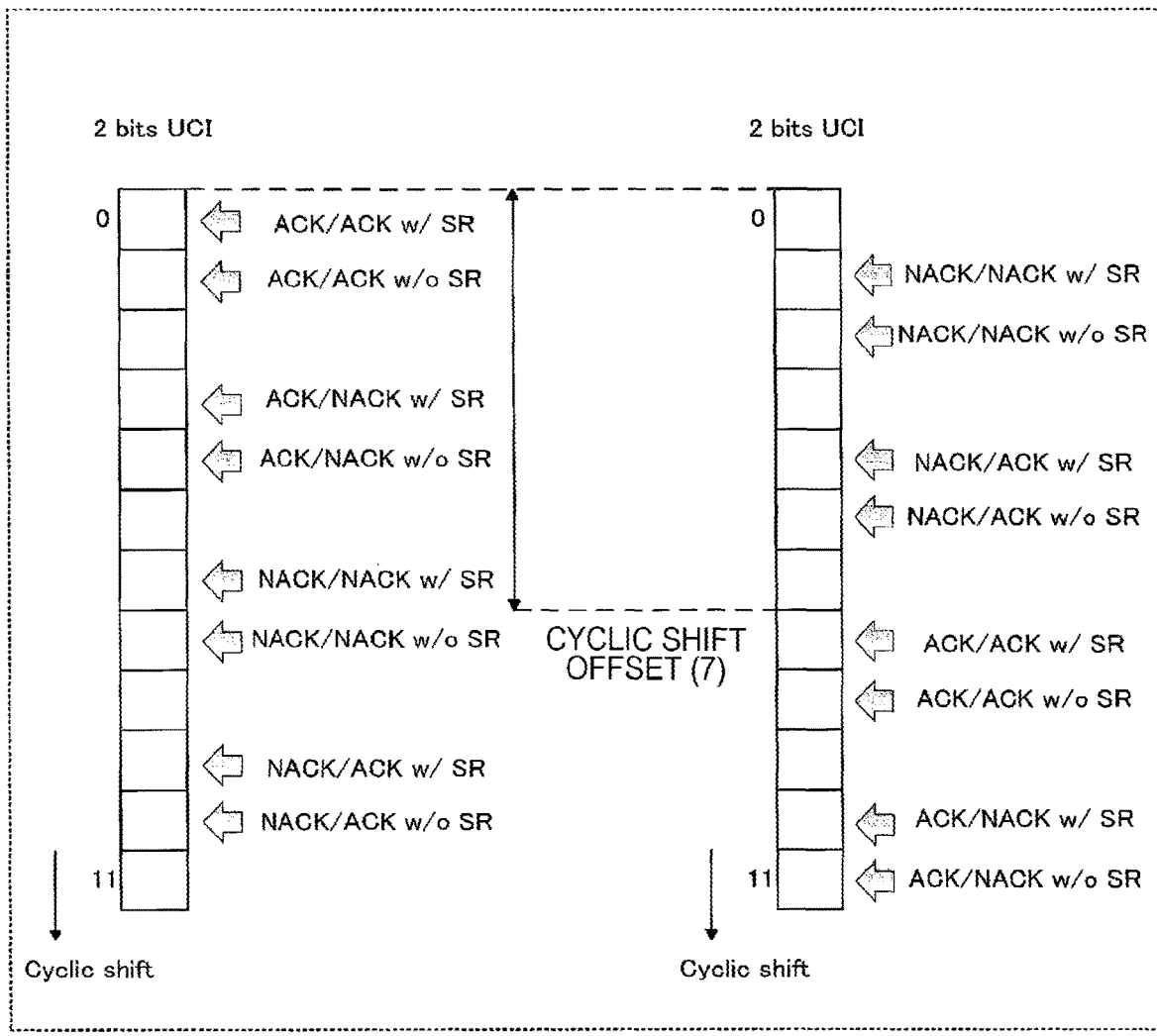
FIG. 10 depicts an example of deciding a cyclic shift pattern for a two-bit UCI according to embodiment 2.

It should be noted that a cyclic shift pattern may be provided as an offset for a cyclic shift, as depicted in FIG. 9 (in the case of a one-bit UCI) and FIG. 10 (in the case of a two-bit UCI), for example. For example, the cyclic shift pattern on the right side in FIG. 9 is a pattern in which an offset 2 is added to the cyclic shift pattern on the left side in FIG. 9. Furthermore, the cyclic shift pattern on the right side in FIG. 10 is a pattern in which an offset 7 is added to the cyclic shift pattern on the left side in FIG. 10.

The cyclic shift pattern of a PUCCH is generated using a pseudo-random sequence, as indicated in section 5.4 in NPL 1, for example. The method for generating a pseudo-random sequence is stipulated in section 7.2 of NPL 1, for example. Specifically, a pseudo-random sequence is initialized in each certain time interval in accordance with the initial value $c_{int}$ of expression (3), for example. In expression (3), if the initial value $c_{int}$ is different, the pseudo-random sequence that is generated is different.

$$c_{int}=n_{ID} \quad (3)$$

In expression (3), $n_{ID}$ is aforementioned identification information used for a PUCCH. In expression (3), an identification ID ($n_{ID}$) used for a PUCCH may be notified to the terminal 200 by means of a higher layer signal specific to the terminal, or may be set by the terminal 200 using a cell ID ($n_{ID}^{cell}$) and subcell-specific information (at least one of $n_{ID}^{cell}$, $n_{ID}^{beam}$, $n_{order}^{RA}$, and $n_{index}^{RA}$) as indicated below.

$$n_{ID}=n_{ID}^{cell}+n_{ID}^{subcell}$$

$$n_{ID}=n_{ID}^{cell}+n_{ID}^{beam}$$

$$n_{ID}=n_{ID}^{cell}+n_{order}^{RA}$$

$$n_{ID}=n_{ID}^{cell}+n_{index}^{RA}$$

$n_{ID}^{subcell}$ indicates a subcell ID, $n_{ID}^{beam}$ indicates a beam ID, $n_{order}^{RA}$ indicates information relating to a random access resource notified in a PDCCH order with which a network requests random access with respect to the terminal 200, and $n_{index}^{RA}$ indicates the number of the random access resource (time, frequency, or code sequence) actually used by the terminal 200. Furthermore, the identification ID used for a PUCCH may be set using a plurality of items of the aforementioned subcell-specific information.

Furthermore, examples of the time units n for hopping a cyclic shift pattern of a PUCCH include symbol units, slot units, subframe units, and the like. Furthermore, examples of time intervals in which a pseudo-random sequence is initialized include multiple symbol units, slot units, multiple slot units, subframe units, multiple subframe units, radio frame units, and the like.

In this way, in the present embodiment, the terminal 200 decides a sequence (PUCCH sequence) that is used for a PUCCH, in accordance with a UCI (ACK, NACK, SR, or the like), and transmits the UCI using the PUCCH sequence. At such time, the PUCCH sequence is calculated using the cell ID of the cell to which the terminal 200 belongs and subcell-specific information. Specifically, the subcell-specific information is used to calculate the initial value of a pseudo-random sequence used for the hopping of the cyclic shift pattern used for the PUCCH sequence.

For example, even within the same cell (same cell ID), the terminal 200 decides cyclic shift patterns for PUCCH sequences using subcell-specific information that is specific to the TRP (or subcell) with which the terminal 200 communicates, and it is thereby possible to randomize interference and to reduce the effect of interference for PUCCHs transmitted from terminals 200 that are communicating with different TRPs within the same cell. In other words, according to the present embodiment, interference can be appropriately controlled in a PUCCH that includes a one to two-bit UCI.

It should be noted that the hopping of the cyclic shift pattern described in the present embodiment and the PUCCH sequence hopping (sequence hopping) described in embodiment 1 may be used together. In the case where hopping of the cyclic shift pattern and sequence hopping are used together, the time units in which sequence hopping is applied and the time units in which cyclic shift hopping is applied may be the same or may be different. For example, sequence hopping may be carried out in slot units and cyclic shift hopping may be carried out in symbol units. Furthermore, the time interval in which a pseudo-random sequence is initialized may also be the same or may be different between the sequence hopping and the cyclic shift hopping. Furthermore, the identification ID (nib) used for a PUCCH may also be the same or may be different between the sequence hopping and the cyclic shift hopping. Thus, different sequence numbers or different cyclic shift patterns can be allocated for PUCCHs transmitted from terminals 200 communicating with different TRPs within the same cell, and the effect of interference can be reduced.

Embodiment 3

In the sequence selection scheme, in the case of a one-bit UCI, PUCCH resources (cyclic shift sequences) for transmitting an ACK without an SR, a NACK without an SR, an ACK with an SR, and a NACK with an SR are ensured in advance for each terminal. In a case where sequences allocated to the same terminal are present within the same PRB, from among the 12 PUCCH resources (cyclic shift sequences) that can be allocated to one PRB, four PUCCH resources are allocated to one terminal.

Similarly, in the case of a two-bit UCI, PUCCH resources (cyclic shift sequences) for transmitting an ACK/ACK without an SR, an ACK/NACK without an SR, a NACK/ACK without an SR, a NACK/NACK without an SR, an ACK/ACK with an SR, an ACK/NACK with an SR, a NACK/ACK with an SR, and a NACK/NACK with an SR are ensured for each terminal. Therefore, from among the 12 PUCCH resources (cyclic shift sequences) that can be allocated to one PRB, eight PUCCH resources are allocated to each terminal.

In other words, in theory, within one PRB, a maximum of up to three UEs can be multiplexed in the case of a one-bit UCI, for example, using the maximum of 12 cyclic shift sequences. However, in this case, because all 12 cyclic shift sequences are used, the effect of randomizing interference decreases even if the aforementioned cyclic shift hopping is applied.

Thus, in the present embodiment, a description will be given regarding a method for reducing the effect of interference by limiting the maximum number of sequences (cyclic shifts) that can be allocated within one PRB.

The base station and the terminal according to the present embodiment have basic configurations that are common to those of the base station 100 and the terminal 200 according to embodiments 1 and 2, and will therefore be described with reference to FIGS. 3 and 4.

Figure 11A:
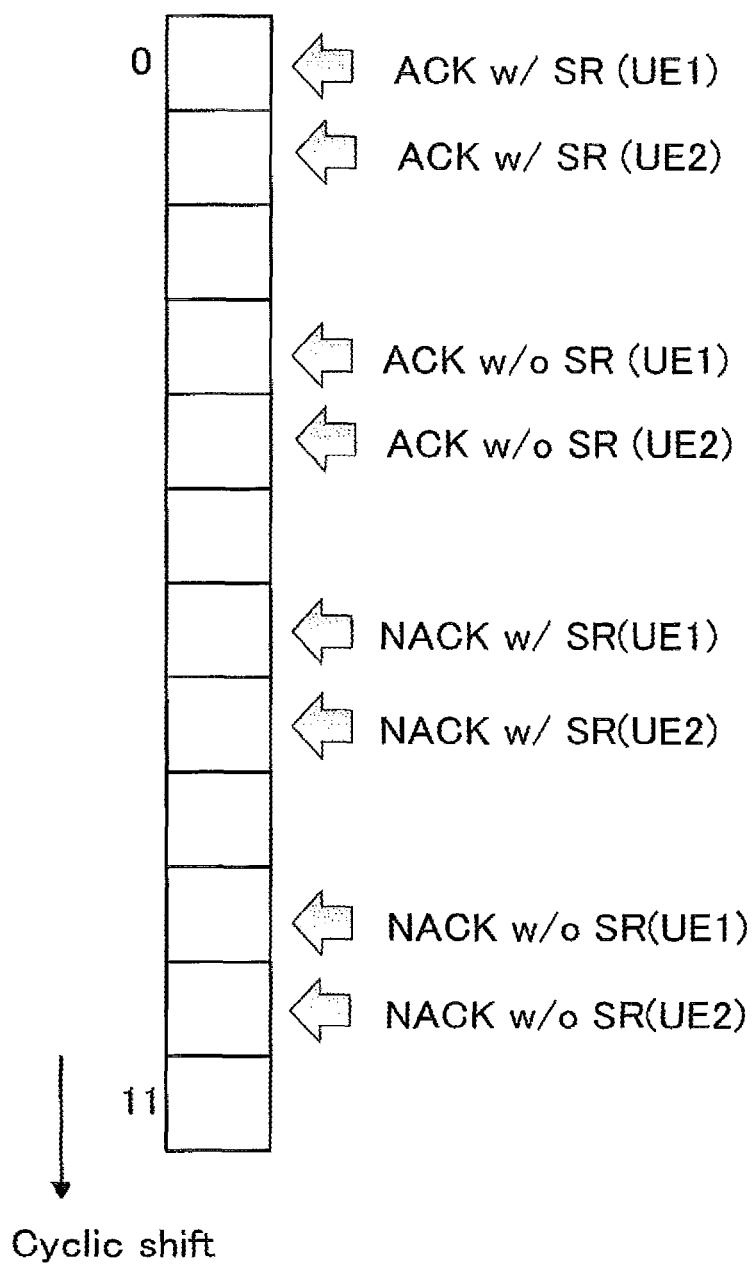
FIG. 11A depicts an example of deciding a cyclic shift pattern for a one-bit UCI according to embodiment 3.
Figure 11B:
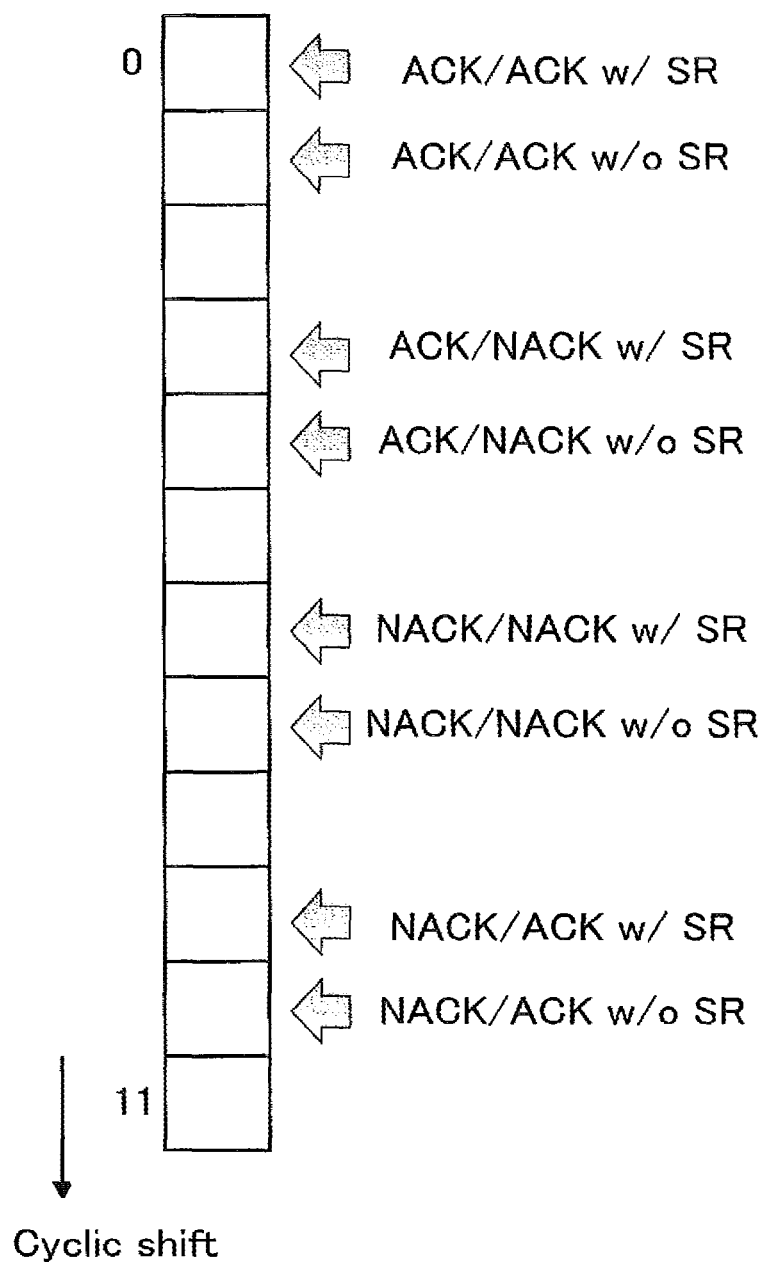
FIG. 11B depicts an example of deciding a cyclic shift pattern for a two-bit UCI according to embodiment 3.

FIG. 11A (the case of a one-bit UCI) and FIG. 11B (the case of a two-bit UCI) depict an example of a cyclic shift pattern in a case where the maximum number of sequences (cyclic shifts) that can be allocated within one PRB is limited to eight.

As mentioned above, in the case of a one-bit UCI, four PUCCH resources are allocated to each terminal 200, and therefore, in FIG. 11A, a maximum of two terminals are multiplexed within one PRB. Furthermore, as mentioned above, in the case of a two-bit UCI, eight PUCCH resources are allocated to each terminal 200, and therefore, in FIG. 11B, a maximum of one terminal is multiplexed within one PRB.

In other words, in FIGS. 11A and 11B, from among the 12 cyclic shift sequences within one PRB, four cyclic shift sequences are not used for a PUCCH sequence. Thus, in the cyclic shift patterns depicted in FIGS. 11A and 11B, it is possible to space apart cyclic shift sequences used for PUCCH sequences. Thus, in this case, due to the aforementioned cyclic shift hopping being applied, there is an increase in the possibility of different cyclic shift sequences being allocated to PUCCHs transmitted from terminals 200 using different cyclic shift patterns, and it is possible to obtain the effect of randomizing interference.

It should be noted that the number of terminals allocated within one PRB may be limited instead of limiting the maximum number of sequences allocated within one PRB (eight in FIGS. 11A and 11B). For example, it can be said that, in FIG. 11A, the maximum number of terminals that can be allocated within one PRB is limited to two terminals, and in FIG. 11B, the maximum number of terminals that can be allocated within one PRB is limited to one terminal.

Furthermore, the maximum number of sequences (cyclic shifts) that can be allocated within one PRB is not restricted to eight, and the number of terminals multiplexed may be limited to one terminal, for example. In the case of a one-bit UCI, the maximum number of sequences (cyclic shifts) that can be allocated within one PRB is four sequences, and in the case of a two-bit UCI, the maximum number of sequences (cyclic shifts) that can be allocated within one PRB is eight sequences.

In this way, according to the present embodiment, by limiting the maximum number of sequences (cyclic shifts) (or the number of terminals) that can be allocated within one PRB in a cyclic shift pattern, several cyclic shifts are not used as PUCCH sequences from among the cyclic shifts within one PRB. The cyclic shifts that are not used as PUCCH sequences can be used for PUCCH sequences in different cyclic shift patterns. Thus, as PUCCH resources, it is possible to reduce the PUCCH sequences that use the same cyclic shift pattern. Thus, according to the present embodiment, the effect of randomizing interference can be further increased.

Embodiment 4

In the present embodiment, consideration is given to a mapping design between uplink control signals such as ACKs, NACKs, and SRs, and PUCCHs (cyclic shifts).

Furthermore, in the present embodiment, attention will be paid to differences in the occurrence probabilities of ACKs, NACKs, and SRs.

The target error rate for the first packet transmission in a downlink HARQ is approximately 10%, for example. From this, probabilistically, the transmission (occurrence probability) of an ACK increases and the transmission (occurrence probability) of a NACK decreases. Therefore, probabilistically, a NACK is likely to be adversely affected by an ACK transmitted from another multiplexed terminal.

As an example, in the mapping method depicted in FIG. 11A, from the ACK and NACK occurrence probabilities, in a case where terminal 1 (UE 1) transmits a NACK, there is a high probability of terminal 2 (UE 2) transmitting an ACK. Therefore, at the base station, there is an increase in the probability of a NACK transmitted from terminal 1 being erroneously received as an ACK that is mapped to a cyclic shift adjacent to a cyclic shift (that is, corresponding to an ACK) having a high probability of being transmitted by terminal 2.

In this kind of mapping method, even if a shift of the cyclic shift pattern described in embodiment 2 is applied, it is not possible to randomize the effect of interference among terminals multiplexed within a cell.

Thus, in the present embodiment, the mapping between ACKs, NACKs, and SRs and PUCCHs (cyclic shifts) is made to be different among terminals in which ACKs/NACKs or SRs are multiplexed.

By doing so, it is possible to randomize the effect of interference from multiplexed terminals that occurs among cyclic shifts.

The base station and the terminal according to the present embodiment have basic configurations that are common to those of the base station 100 and the terminal 200 according to embodiment 1, and will therefore be described with reference to FIGS. 3 and 4.

Figure 12A:
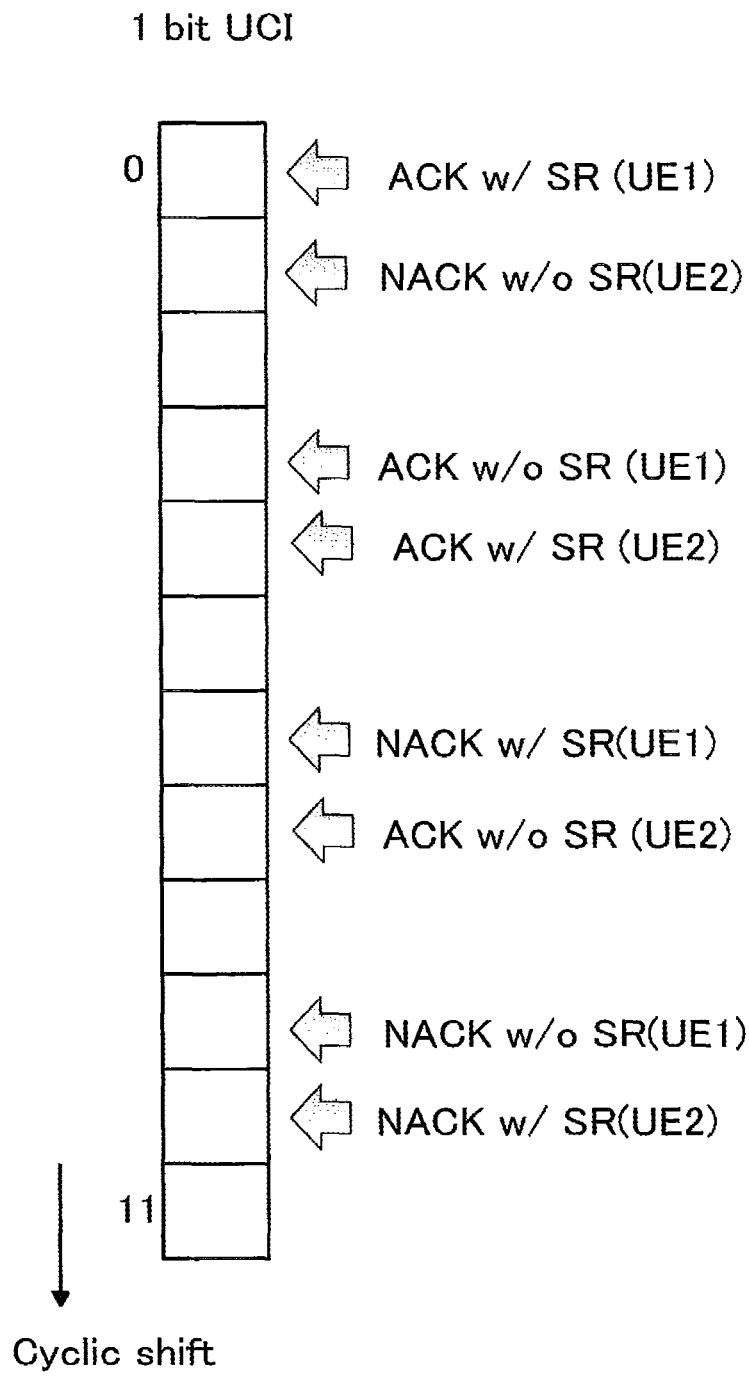
FIG. 12A depicts an example of mapping a UCI according to embodiment 4.
Figure 12B:
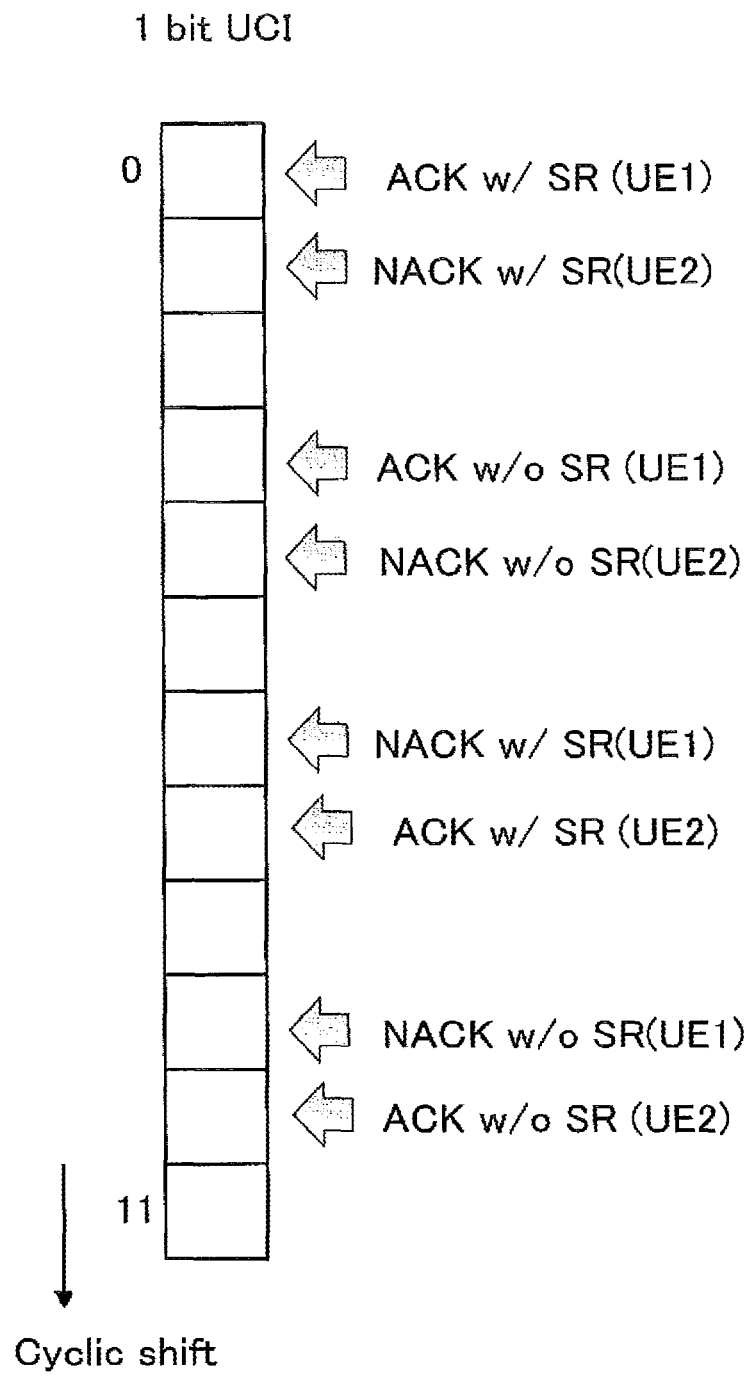
FIG. 12B depicts an example of mapping a UCI according to embodiment 4.

FIGS. 12A and 12B depict an example of a mapping method between PUCCHs (cyclic shifts) and ACKs, NACKs, and SRs in each of terminals 1 and 2 (UEs 1 and 2) in which ACKs/NACKs or SRs are multiplexed.

Specifically, in FIGS. 12A and 12B, the mapping for terminal 1 is the same as the mapping depicted in FIG. 11A.

However, FIG. 12A depicts a cyclic shift pattern in which an offset 3 is added to a cyclic shift pattern of an ACK with an SR, an ACK without an SR, a NACK with an SR, and a NACK without an SR for terminal 2 depicted in FIG. 11A. Furthermore, FIG. 12B depicts a cyclic shift pattern in which an offset 6 is added to a cyclic shift pattern of an ACK with an SR, an ACK without an SR, a NACK with an SR, and a NACK without an SR (that is, an offset 3 is added to the cyclic shift pattern depicted in FIG. 12A) for terminal 2 depicted in FIG. 11A.

Thus, there is an increase in the ratio at which an ACK having a high occurrence probability is mapped to a cyclic shift that is adjacent to a cyclic shift to which a NACK having a low occurrence probability is mapped. Thus, for example, even in a case where terminal 1 (UE 1) transmits a NACK, at the base station, there is a decrease in the probability of the NACK transmitted from terminal 1 being erroneously received as an ACK due to an ACK having a high probability of being transmitted by terminal 2.

Next, a description will be given regarding another mapping method that takes differences in the occurrence probabilities of ACKs, NACKs, and SRs into consideration. Specifically, hopping of the cyclic shift pattern described in embodiment 2 mentioned above is applied with consideration being given to differences in the occurrence probabilities of ACKs, NACKs, and SRs.

Figure 13:
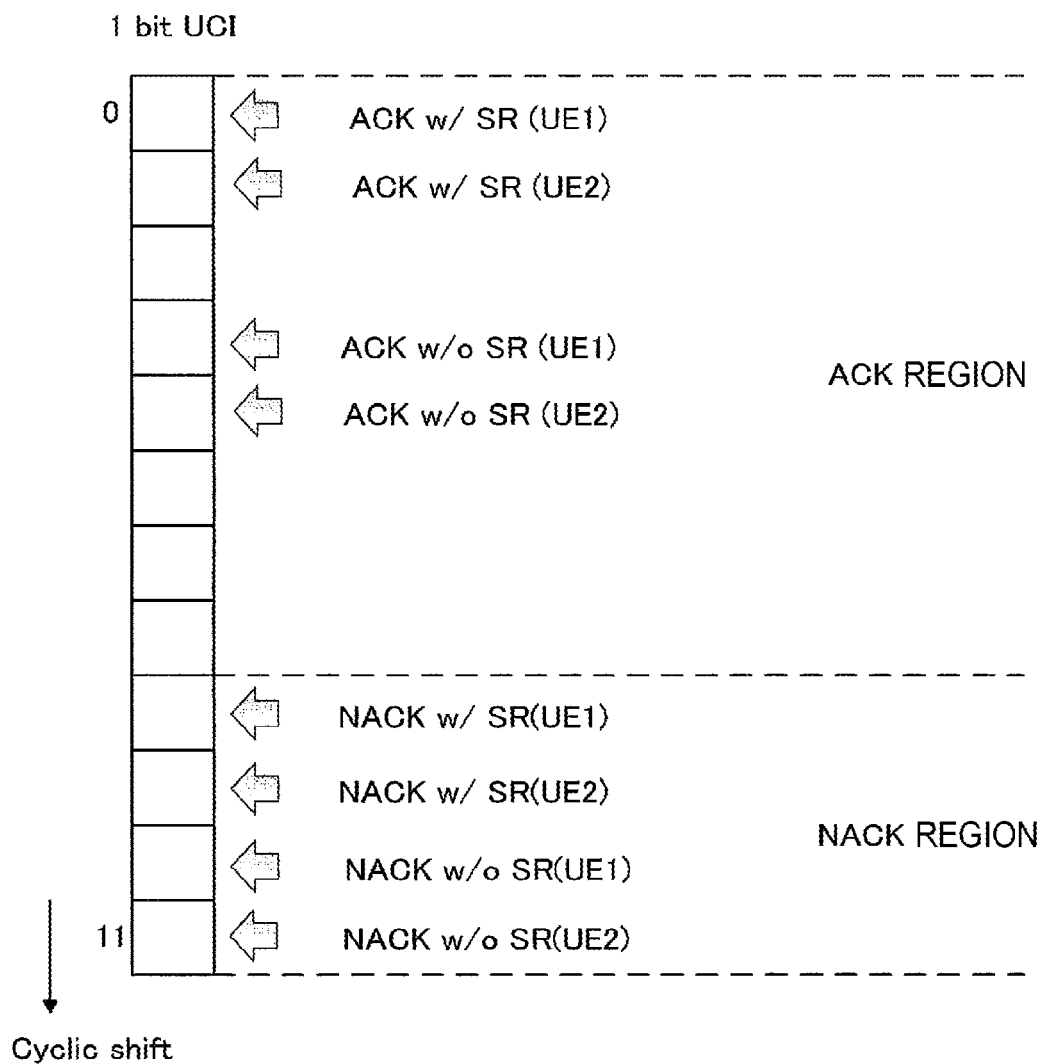
FIG. 13 depicts an example of mapping a one-bit UCI according to embodiment 4.
Figure 14:
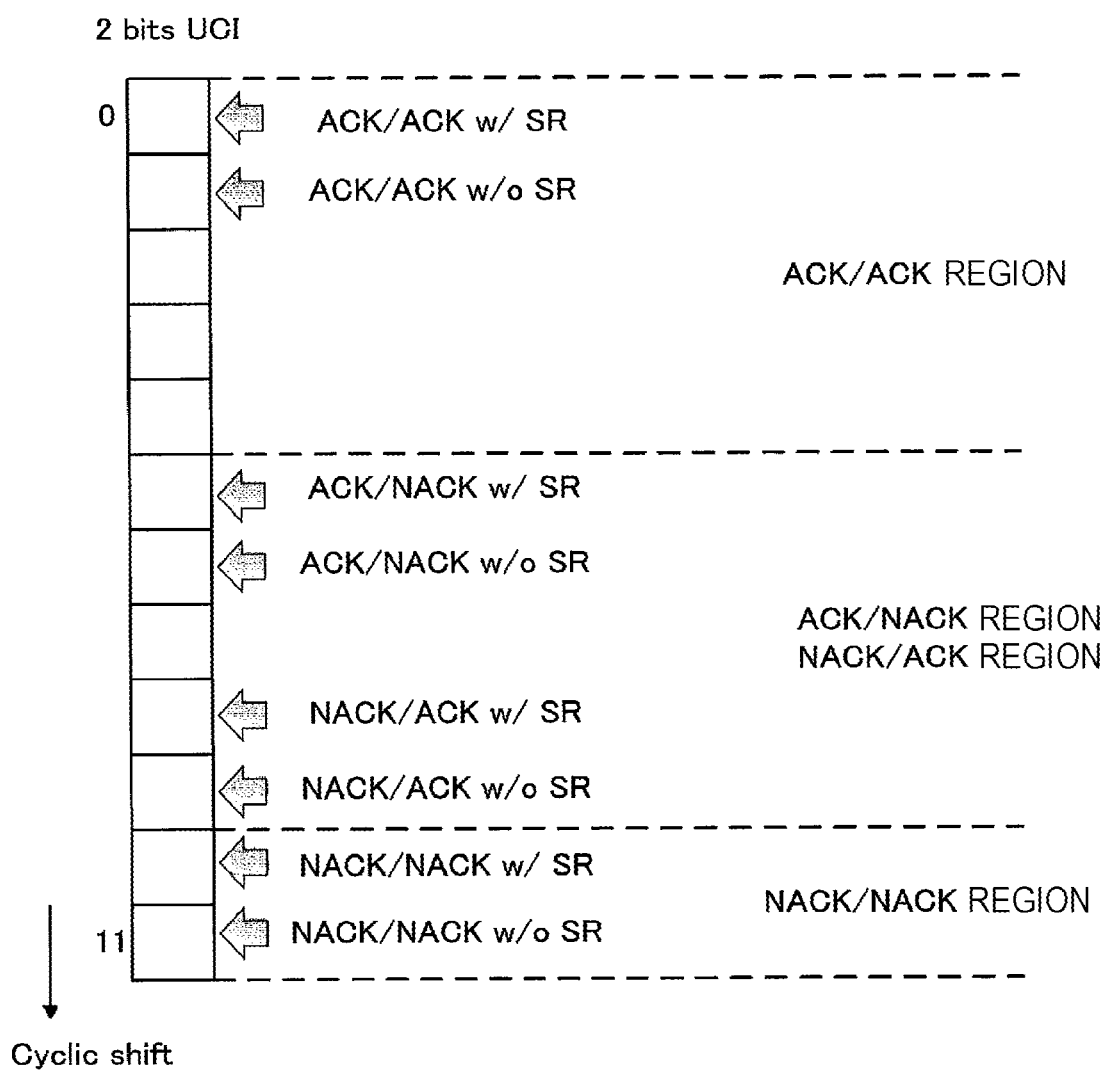
FIG. 14 depicts an example of mapping a two-bit UCI according to embodiment 4.

For example, as depicted in FIG. 13 or FIG. 14, a region including cyclic shifts allocated to ACKs (ACK region) and a region including cyclic shifts allocated to NACKs (NACK region) may be separated.

In this case, hopping of the cyclic shift pattern is carried out on each ACK and NACK. In other words, a cyclic shift that can be adopted for an ACK is a cyclic shift within the ACK region, and a cyclic shift that can be adopted for a NACK is a cyclic shift within the NACK region.

Furthermore, as depicted in FIG. 13 or FIG. 14, in the 12 cyclic shifts (0 to 11) that can be allocated within one PRB, the ratio of the ACK region may be set to be higher than the ratio of the NACK region.

By making the ratio of cyclic shifts that can be allocated to ACKs to be high within the cyclic shifts that can be allocated within one PRB, the number of cyclic shift patterns for ACKs increases, and it is therefore possible to reduce the probability of the same cyclic shift pattern being used in a plurality of terminals 200 to transmit ACKs having a high probability of being transmitted.

On the other hand, when the ratio of cyclic shifts that can be allocated to NACKs decreases within the cyclic shifts that can be allocated within one PRB, the number of cyclic shift patterns for NACKs becomes less. However, since the probability of a NACK being transmitted is low, the probability of NACKs being transmitted at the same time by means of the same cyclic shift pattern in a plurality of terminals 200 is low and the probability of there being a collision between PUCCHs including NACKs is low, and therefore the effect on system performance is small.

In this way, according to the present embodiment, interference can be randomized in short PUCCH transmissions by setting the mapping for PUCCH sequences (cyclic shifts) in accordance with the occurrence probabilities of ACKs and NACKs that are transmitted using PUCCHs, and system performance can be improved by reducing the effect of interference.

Embodiment 5

In the present embodiment, a description will be given regarding a case where hopping of the cyclic shift pattern described in embodiment 2 is applied with consideration being given to differences in the target error rates for ACKs, NACKs, and SRs.

The base station and the terminal according to the present embodiment have basic configurations that are common to those of the base station 100 and the terminal 200 according to embodiment 1, and will therefore be described with reference to FIGS. 3 and 4.

Figure 15:
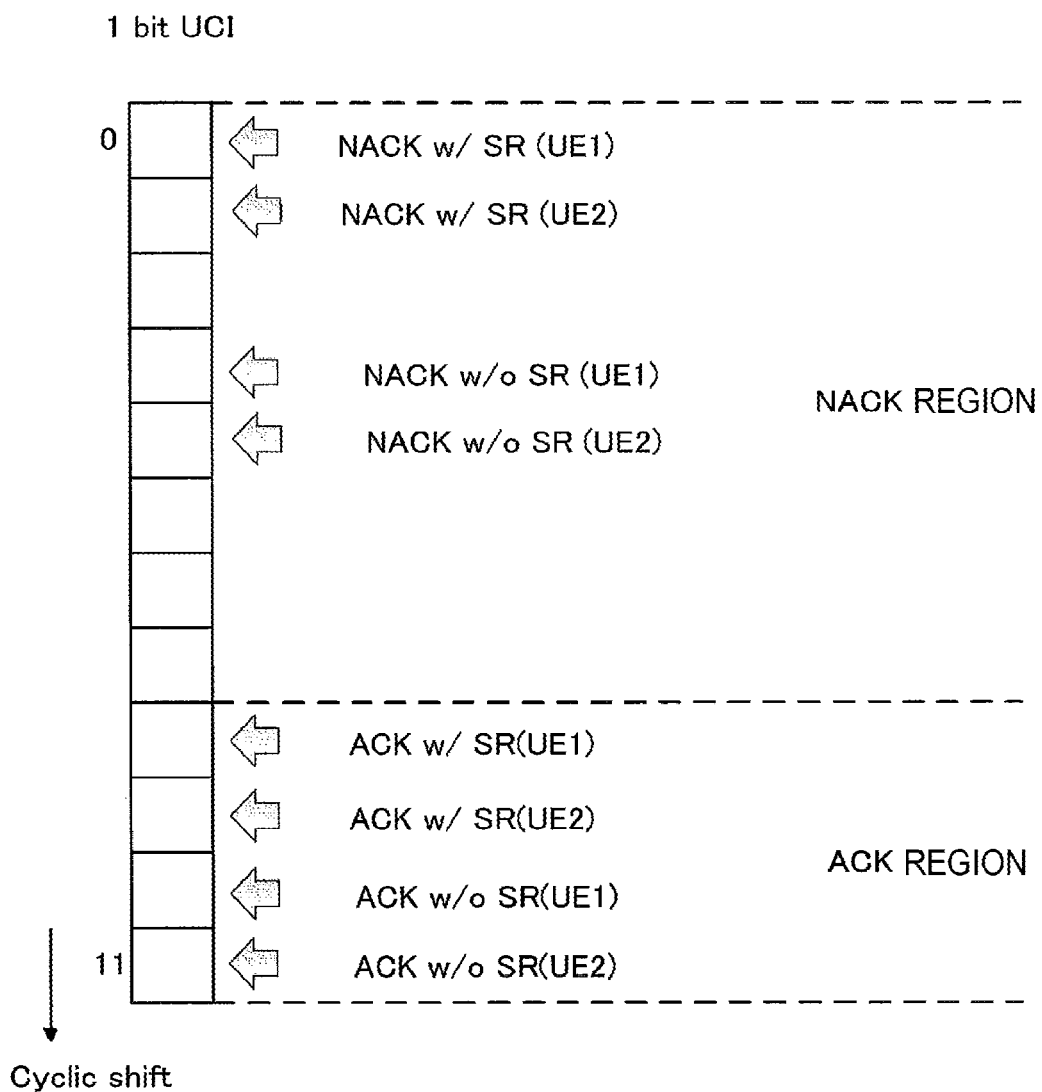
FIG. 15 depicts an example of mapping a one-bit UCI according to embodiment 5.
Figure 16:
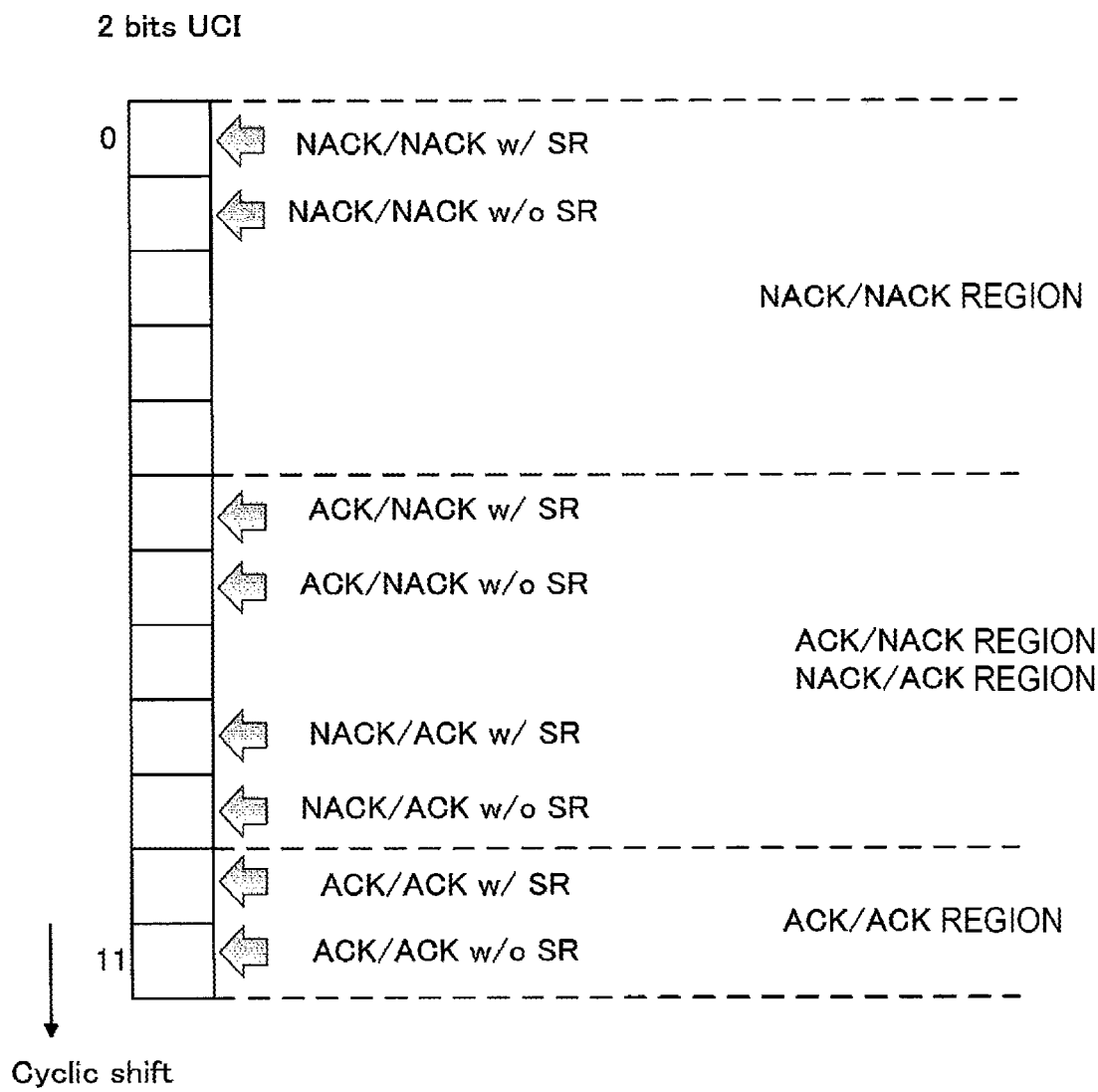
FIG. 16 depicts an example of mapping a two-bit UCI according to embodiment 5.

For example, as depicted in FIGS. 15 and 16, a region including cyclic shifts allocated to ACKs (ACK region) and a region including cyclic shifts allocated to NACKs (NACK region) are separated.

In this case, hopping of the cyclic shift pattern is carried out on each ACK and NACK. In other words, a cyclic shift that can be adopted for an ACK is a cyclic shift within the ACK region, and a cyclic shift that can be adopted for a NACK is a cyclic shift within the NACK region.

Furthermore, as depicted in FIGS. 15 and 16, in the 12 cyclic shifts (0 to 11) that can be allocated within one PRB, the ratio of the NACK region is set to be higher than the ratio of the ACK region.

By making the ratio of cyclic shifts that can be allocated to NACKs to be high within the cyclic shifts that can be allocated within one PRB, the number of cyclic shift patterns for NACKs increases, and it is therefore possible to reduce the probability of the same cyclic shift pattern being used in a plurality of terminals 200 to transmit NACKs, which have high requirements for the target error rate.

On the other hand, when the ratio of cyclic shifts that can be allocated to ACKs decreases within the cyclic shifts that can be allocated within one PRB, the number of cyclic shift patterns for ACKs becomes less. However, even when ACKs, which have low requirements for the target error rate, are transmitted by means of the same cyclic shift pattern in a plurality of terminals 200 and there is a collision between PUCCHs that include ACKs, the effect on the system is comparatively small compared to that of NACKs.

In this way, according to the present embodiment, interference can be randomized in short PUCCH transmissions by setting the mapping for PUCCH sequences (cyclic shifts) in accordance with the target error rates (transmission reliabilities) of ACKs and NACKs that are transmitted using PUCCHs, and system performance can be improved by reducing the effect of interference.

Embodiments of the present disclosure have been described hereinabove.

Other Embodiments (1) In the aforementioned embodiments, a description has been given regarding SRs and HARQ-ACKs as uplink control information (UCI) transmitted by the terminal 200. However, the uplink control information transmitted by the terminal 200 is not restricted to SRs and HARQ-ACKs and may be other uplink control information (for example, CSI or the like).

(2) In the aforementioned embodiments, a description has been given regarding a case where information relating to a subcell ID, a beam ID, and random access served as an example of identification information (subcell-specific information) used in addition to a cell ID when calculating an identification ID ($n_{ID}$) used for a PUCCH. However, the identification information used in addition to a cell ID when calculating an identification ID used for a PUCCH is not restricted to these items of information and may be other information that can adopt a different value for each TRP. In addition, the identification information used in addition to a cell ID when calculating an identification ID used for a PUCCH may be information that is set with respect to the terminal 200 in the initial access (random access) stage.

(3) In the aforementioned embodiments, a description has been given regarding short PUCCHs; however, an embodiment of the present disclosure mentioned above may be applied in a case where a one to two-bit UCI is transmitted in a long PUCCH.

(4) It is possible for the present disclosure to be realized by means of software, hardware, or software in cooperation with hardware. Each functional block used in the description of the aforementioned embodiments may be partially or entirely realized as an LSI, which is an integrated circuit, and each process described in the aforementioned embodiments may be partially or entirely controlled by one LSI or a combination of LSIs. The LSIs may be configured from individual chips, or may be configured from one chip so as to include some or all of the functional blocks. The LSIs may be provided with a data input and output. The LSIs are also referred to as ICs, system LSIs, super LSIs, or ultra LSIs depending on differences in the degree of integration. The circuit integration technique is not limited to an LSI, and may be realized using a dedicated circuit, a general-purpose processor, or a dedicated processor. Furthermore, after an LSI has been manufactured, an FPGA (field-programmable gate array) that can be programmed, or a reconfigurable processor with which the connections and settings of circuit cells within the LSI can be reconfigured, may be used. The present disclosure may be realized as digital processing or analog processing. In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A terminal of the present disclosure is provided with: a circuit that decides a sequence used for an uplink control channel, in accordance with uplink control information; and a transmitter that transmits the uplink control information using the sequence, in which the sequence is decided using cell identification information that identifies a cell to which the terminal belongs, and subcell-specific information relating to at least one subcell included in the cell.

In the terminal of the present disclosure, the subcell-specific information includes at least one from among information that identifies a subcell to which the terminal connects, information that identifies a beam used for communication by the terminal, and information indicating a random access resource used for communication by the terminal.

In the terminal of the present disclosure, the subcell-specific information is used to calculate an initial value of a pseudo-random sequence used for hopping of a sequence number of the sequence.

In the terminal of the present disclosure, the subcell-specific information is used to calculate an initial value of a pseudo-random sequence used for hopping of a cyclic shift pattern used for the sequence.

In the terminal of the present disclosure, the cyclic shift pattern is different for each terminal.

A terminal of the present disclosure is provided with: a circuit that decides a sequence used for an uplink control channel, in accordance with uplink control information; and a transmitter that transmits the uplink control information using the sequence, in which the maximum number of sequences that can be allocated within one resource block of the uplink control channel is limited.

In the terminal of the present disclosure, the one resource block is composed of 12 subcarriers, and the maximum number is eight.

In the terminal of the present disclosure, the one resource block is composed of 12 subcarriers, and the maximum number is four when the uplink control information is one bit, and is eight when the uplink control information is two bits.

A terminal of the present disclosure is provided with: a circuit that decides a sequence used for an uplink control channel, in accordance with uplink control information; and a transmitter that transmits the uplink control information using the sequence, in which the uplink control information includes at least an ACK and a NACK, and cyclic shifts used for the sequence are separated into a first region that includes a cyclic shift allocated to the ACK and a second region that includes a cyclic shift allocated to the NACK.

In the terminal of the present disclosure, the number of cyclic shifts included in the first region is greater than the number of cyclic shifts included in the second region.

In the terminal of the present disclosure, the number of cyclic shifts included in the second region is greater than the number of cyclic shifts included in the first region.

In the terminal of the present disclosure, hopping of a cyclic shift pattern for the ACK is carried out using a cyclic shift included in the first region, and hopping of a cyclic shift pattern for the NACK is carried out using a cyclic shift included in the second region.

A communication method of the present disclosure includes: deciding a sequence used for an uplink control channel, in accordance with uplink control information; and transmitting the uplink control information using the sequence, in which the sequence is decided using cell identification information that identifies a cell to which the terminal belongs, and subcell-specific information relating to at least one subcell included in the cell.

A communication method of the present disclosure includes: deciding a sequence used for an uplink control channel, in accordance with uplink control information; and transmitting the uplink control information using the sequence, in which the maximum number of sequences that can be allocated within one resource block of the uplink control channel is limited.

A communication method of the present disclosure includes: deciding a sequence used for an uplink control channel, in accordance with uplink control information; and transmitting the uplink control information using the sequence, in which the uplink control information includes at least an ACK and a NACK, and cyclic shifts used for the sequence are separated into a first region that includes a cyclic shift allocated to the ACK and a second region that includes a cyclic shift allocated to the NACK.

An embodiment of the present disclosure is useful in a mobile communication system.

REFERENCE SIGNS LIST

100 Base station
101, 209 Control unit
102 Data generation unit
103, 107, 110 Encoding unit
104 Retransmission control unit
105, 108, 111 Modulation unit
106 Higher layer control signal generation unit
109 Downlink control signal generation unit
112, 212 Signal allocation unit
113, 213 IFFT unit
114, 214 Transmission unit
115, 201 Antenna
116, 202 Reception unit 117, 203 FFT unit
118, 204 Extraction unit
119 SR detection unit
120 PUCCH demodulation/decoding unit
121 Determination unit
200 Terminal
205 Downlink control signal demodulation unit
206 Higher layer control signal demodulation unit
207 Downlink data signal demodulation unit
208 Error detection unit
210 SR generation unit
211 HARQ-ACK generation unit

The invention claimed is:

1. A base station comprising:
a transmitter, which, in operation, transmits, to a terminal, information related to PUCCH (physical uplink control channel) resource;
a receiver, which, in operation, receives uplink control information, the uplink control information being transmitted from the terminal using a cyclic shift determined depending on the uplink control information out of a plurality of cyclic shifts, which are available for a plurality of terminals in a cell and which are limited in number to less than 12 that is the maximum number of cyclic shifts based on the information related to PUCCH, cyclic shift(s) other than the plurality of cyclic shifts limited in number to less than 12 among the maximum number of cyclic shifts are unavailable for the plurality of terminals; and
a processor, which, in operation, determines an ACK or a NACK corresponding to the uplink control information, wherein:
each of the plurality of cyclic shifts is associated with at least one of the ACK or the NACK for an uplink control information bit,
the plurality of cyclic shifts include a plurality of adjacent cyclic shift pairs, and
for each adjacent cyclic shift pair, one of two cyclic shifts is associated with the ACK for the uplink control information bit and the other of the two cyclic shifts is associated with the NACK for the uplink control information bit.

2. The base station according to claim 1, wherein the uplink control information has 1 or 2 bits.

3. The base station according to claim 1, wherein the receiver, in operation, receives the uplink control information on a short PUCCH (physical uplink control channel) of 1 or 2 symbols.

4. The base station according to claim 1, wherein the uplink control information includes at least one of ACK or NACK with the cyclic shift determined depending on said at least one of ACK or NACK.

5. The base station according to claim 1, wherein a cyclic shift allocated to one terminal has a given offset that is added to a cyclic shift allocated to another terminal out of the plurality of cyclic shifts.

6. The base station according to claim 1, wherein the transmitter, in operation, transmits, to the terminal, the information in a higher layer control signal.

7. The base station according to claim 1, wherein the transmitter, in operation, transmits, to the terminal, the information in a higher layer control signal, the cyclic shift being determined based on both the information and the uplink control information.

8. A communication method comprising:
transmitting, to a terminal, information related to PUCCH (physical uplink control channel) resource; and
receiving uplink control information, the uplink control information being transmitted from the terminal using a cyclic shift determined depending on the uplink control information out of a plurality of cyclic shifts, which are available for a plurality of terminals in a cell and which are limited in number to less than 12 that is the maximum number of cyclic shifts based on the information related to PUCCH, cyclic shift(s) other than the plurality of cyclic shifts limited in number to less than 12 among the maximum number of cyclic shifts are unavailable for the plurality of terminals, wherein:
each of the plurality of cyclic shifts is associated with at least one of ACK or NACK for an uplink control information bit,
the plurality of cyclic shifts include a plurality of adjacent cyclic shift pairs, and
for each adjacent cyclic shift pair, one of two cyclic shifts is associated with the ACK for the uplink control information bit and the other of the two cyclic shifts is associated with the NACK for the uplink control information bit.

9. The communication method according to claim 8, wherein the uplink control information has 1 or 2 bits.

10. The communication method according to claim 8, wherein the receiving includes receiving the uplink control information on a short PUCCH (physical uplink control channel) of 1 or 2 symbols.

11. The communication method according to claim 8, wherein the uplink control information includes at least one of ACK or NACK with the cyclic shift determined depending on said at least one of ACK or NACK.

12. The communication method according to claim 8, wherein a cyclic shift allocated to one terminal has a given offset that is added to a cyclic shift allocated to another terminal out of the plurality of cyclic shifts.

13. The communication method according to claim 8, wherein the transmitting includes transmitting, to the terminal, the information in a higher layer control signal.

14. The communication method according to claim 8, wherein the transmitting includes transmitting, to the terminal, the information in a higher layer control signal, the cyclic shift being determined based on both the information and the uplink control information.

* * * * *